(12) United States Patent
Yang et al.

(10) Patent No.: US 12,460,701 B2
(45) Date of Patent: Nov. 4, 2025

(54) SPEED REDUCER, JOINT MODULE AND ROBOTIC ARM

(71) Applicant: T-MAX (HANGZHOU) TECHNOLOGY CO., LTD., Hangzhou (CN)

(72) Inventors: Huizhong Yang, Hangzhou (CN); Yilin Yang, Hangzhou (CN); Zhaobo Qing, Hangzhou (CN); Qiong Liu, Hangzhou (CN)

(73) Assignee: T-MAX (HANGZHOU) TECHNOLOGY, CO., LTD., Zhejiang (CN)

( * ) Notice: Subject to any disclaimer, the term of this patent is extended or adjusted under 35 U.S.C. 154(b) by 0 days.

(21) Appl. No.: 18/976,170

(22) Filed: Dec. 10, 2024

(65) Prior Publication Data
US 2025/0230855 A1 Jul. 17, 2025

(30) Foreign Application Priority Data
Jan. 16, 2024 (CN) ......................... 202410066636.X

(51) Int. Cl.
*F16H 1/32* (2006.01)
*F16D 59/00* (2006.01)
*F16D 121/16* (2012.01)

(52) U.S. Cl.
CPC .............. *F16H 1/32* (2013.01); *F16D 59/00* (2013.01); *F16D 2121/16* (2013.01)

(58) Field of Classification Search
CPC ........ F16H 1/32; F16H 2001/323; F16H 3/70; F16H 57/10
See application file for complete search history.

(56) References Cited

U.S. PATENT DOCUMENTS

| | | | | |
|---|---|---|---|---|
| 1,287,837 | A * | 12/1918 | Bentley | F16H 1/32 475/181 |
| 6,342,023 | B1 * | 1/2002 | Willmot | F16H 55/08 475/180 |
| 8,936,525 | B2 * | 1/2015 | Shimada | B60K 7/00 475/149 |

FOREIGN PATENT DOCUMENTS

| | | |
|---|---|---|
| CN | 101379318 A | 3/2009 |
| CN | 106494273 A | 3/2017 |

(Continued)

OTHER PUBLICATIONS

International Search Report and Written Opinion of the International Searching Authority for PCT International Application No. PCT/CN2024/075476 mailed Apr. 4, 2024, 20 pages with English translation.

*Primary Examiner* — Huan Le
(74) *Attorney, Agent, or Firm* — Perkins Coie LLP

(57) ABSTRACT

In some aspects, a speed reducer includes an inner gear having an inner gear hole; an outer gear having an outer gear hole, arranged in the inner gear hole and meshing with the inner gear; an eccentric wheel rotatably supported in the outer gear hole, the outer gear being driven by the eccentric wheel to revolve around the rotation axis of the eccentric wheel while rotating around its own axis; a brake block arranged on the eccentric wheel to rotate together with the eccentric wheel, the brake block being movable relative to the eccentric wheel between a braking position and a release position; an elastic member coupled to the eccentric wheel and the brake block, and configured to press the brake block towards the braking position; and a drive member coupled to the eccentric wheel, a rotation axis of the drive member being coaxial with the rotation axis of the eccentric wheel.

20 Claims, 26 Drawing Sheets

(56) References Cited

FOREIGN PATENT DOCUMENTS

| | | |
|---|---|---|
| CN | 107559388 A | 1/2018 |
| CN | 115571028 A | 1/2023 |
| CN | 218228728 U | 1/2023 |
| CN | 116439933 A | 7/2023 |
| JP | 2018096386 A | 6/2018 |

* cited by examiner

SPEED REDUCER, JOINT MODULE AND ROBOTIC ARM

CROSS-REFERENCE TO RELATED APPLICATIONS

This patent document claims priority to and benefits of Chinese Patent Application No. 202410066636.X, filed on Jan. 16, 2024. The entire content of the aforementioned patent document is incorporated by reference for all purposes.

TECHNICAL FIELD

The present disclosure relates to the field of robotics, and more particularly to a speed reducer, a joint module, and a robotic arm.

BACKGROUND

Speed reducers are widely used in electromechanical equipment such as cranes, drive joints of robots, and winches. Conventionally, speed reducers have problems such as complex structures, large volumes, low torque density, and low load capacity. Also, typically, an electromagnetic brake is usually mounted on a motor shaft of a drive motor, in order to avoid rotation of an output end of the drive motor of the electromechanical equipment after the power is cut off. In addition, existing electromechanical equipment uses mechanisms such as worm gear pairs to achieve reverse braking. However, conventional braking measures have problems such as complex structures, a large number of parts, large volumes, small braking torques, large consumption of braking friction, high cost, and low braking reliability. A new mechanism and approach is needed to alleviate such problems for electromechanical equipment and improve the cost and reliability of speed reduction for such equipment.

SUMMARY

In some aspects, a speed reducer according to embodiments of the present technology includes: an inner gear having an inner gear hole; an outer gear having an outer gear hole, and at least partially arranged in the inner gear hole and meshing with the inner gear; an eccentric wheel rotatably supported in the outer gear hole, a rotation axis of the eccentric wheel being coaxial with a central axis of the inner gear, and the outer gear being driven by the eccentric wheel to revolve around the rotation axis of the eccentric wheel while rotating around its own axis; a brake block arranged on the eccentric wheel to rotate together with the eccentric wheel, the brake block being movable relative to the eccentric wheel between a braking position where the brake block abuts against the outer gear and a release position where the brake block is separated from the outer gear; an elastic member coupled to the eccentric wheel and the brake block, and configured to press the brake block towards the braking position; and a drive member coupled to the eccentric wheel, a rotation axis of the drive member being coaxial with the rotation axis of the eccentric wheel. When the drive member rotates, the brake block moves to the release position relative to the eccentric wheel so that the drive member drives the eccentric wheel and the brake block to rotate together, and when the drive member stops rotating, the elastic member pushes the brake block to the braking position to prevent the eccentric wheel and the brake block from rotating together.

In some aspects, a speed reducer according to embodiments of the present technology includes: an inner gear having an inner gear hole, a central axis of the inner gear hole being coaxial with a rotation axis of the inner gear; an outer gear having an outer gear hole, the outer gear being at least partially arranged in the inner gear hole and meshing with the inner gear; an eccentric wheel having an eccentric wheel hole, the eccentric wheel being rotatably arranged in the outer gear hole to drive the outer gear to revolve around a central axis of the eccentric wheel hole and rotate around its own axis, wherein a rotation axis of the eccentric wheel, the central axis of the eccentric wheel hole, and the central axis of the inner gear are coaxial, and a central axis of an outer peripheral surface of the eccentric wheel is eccentric relative to the central axis of the eccentric wheel hole; a brake block arranged on the eccentric wheel to rotate together with the eccentric wheel, wherein the brake block is movable relative to the eccentric wheel between a braking position where the brake block abuts against the outer gear and a release position where the brake block is separated from the outer gear; a spring coupled to the eccentric wheel and the brake block, and configured to press the brake block towards the braking position; and a drive member coupled to the eccentric wheel, a rotation axis of the drive member being coaxial with the rotation axis of the eccentric wheel. When the drive member rotates, the brake block moves to the release position relative to the eccentric wheel so that the drive member drives the eccentric wheel and the brake block to rotate together, and when the drive member stops rotating, the spring pushes the brake block to the braking position to prevent the eccentric wheel and the brake block from rotating together.

In some aspects, a speed reducer according to embodiments of the present technology includes: an inner gear having an inner gear hole; an outer gear having an outer gear hole, the outer gear being at least partially arranged in the inner gear hole and meshing with the inner gear; an eccentric member rotatably arranged in the outer gear hole to drive the outer gear, a rotation axis of the eccentric member being coaxial with a central axis of the inner gear, a central axis of an outer peripheral surface of the eccentric member being eccentric relative to the rotation axis of the eccentric member, and the outer gear being rotatable around its own axis and revolvable around the rotation axis of the eccentric member; a brake member arranged on the eccentric member to rotate together with the eccentric member, the brake member being movable between a braking position and a release position relative to the eccentric member, wherein in a radial direction of the eccentric member, the brake member when in the braking position is further away from the rotation axis of the eccentric member than when in the release position; or when the brake member moves from the release position towards the braking position, the brake member moves along a circumferential direction of the eccentric member and moves outwards along the radial direction of the eccentric member at the same time; an elastic member coupled to the eccentric member and the brake member, and configured to press the brake member towards the braking position; and a rotatable drive member, a rotation axis of the drive member being coaxial with the rotation axis of the eccentric member, wherein, when the drive member rotates, the brake member moves to the release position relative to the eccentric member so that the drive member drives the eccentric member and the brake member to rotate together, and when the drive member stops rotating, the elastic member pushes the brake member to the braking position to prevent the eccentric member and the brake member from rotating together.

DETAILED DESCRIPTION

Figure 1:
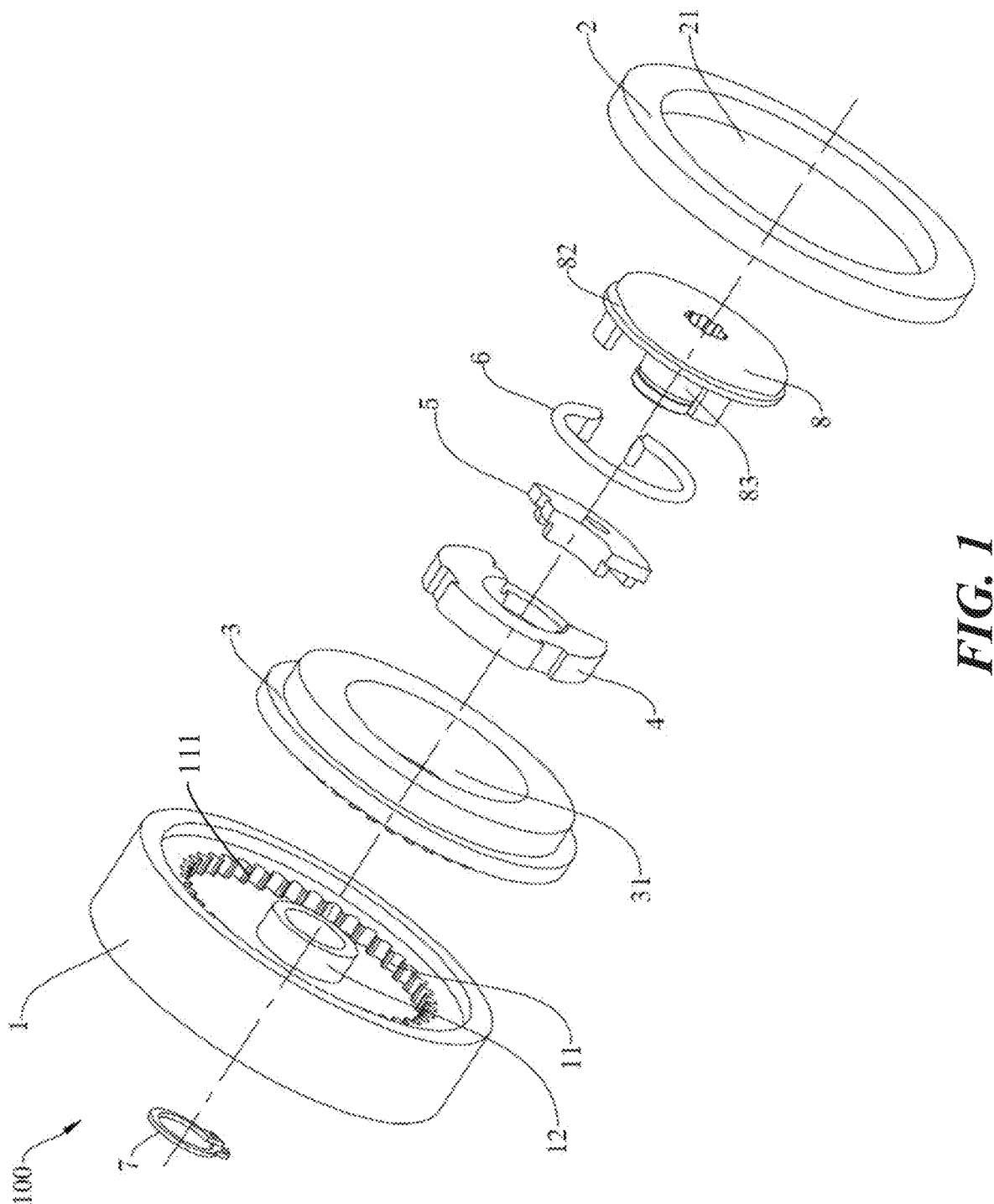
FIG. 1 is a perspective view of a speed reducer according to embodiments of the present technology.

Embodiments of the present technology are described in detail below, examples of which are shown in the accompanying drawings. The following embodiments described with reference to the accompanying drawings are illustrative. It should be understood that the embodiments described are intended to explain the present technology, but not to limit the present technology.

A speed reducer according to example embodiments of the present technology is described below.

As shown in FIGS. 1 to 17, a speed reducer 100 according to some example embodiments of the present technology includes an inner gear 1, an outer gear 3, an eccentric wheel 4, a brake block 5, an elastic member 6, and a drive member 8. In some embodiments of the speed reducer 100, the speed reducer 100 may optionally include a limit disc 7 (also referred to as "snap ring 7") and/or a cover plate 2, which are illustrated in the example shown in FIGS. 1 and 2.

The inner gear 1 has a concentric inner gear hole 11. In some embodiments, for example, the inner gear 1 can include inner teeth 111 that are arranged on a peripheral surface of the inner gear hole 11. In some embodiments, for example, the inner gear hole 11 includes a recessed portion with respect to the peripheral wall of the inner gear 1, where the inner gear hole 11 includes an aperture (hole) in a central region of the recessed portion of the inner gear hole 11. It should be understood that the concentric inner gear hole refers to a central axis of an outer peripheral surface of the inner gear 1 (which may also be called a central axis of the inner gear 1) being coaxial with a central axis of the inner gear hole 11.

Figure 3:
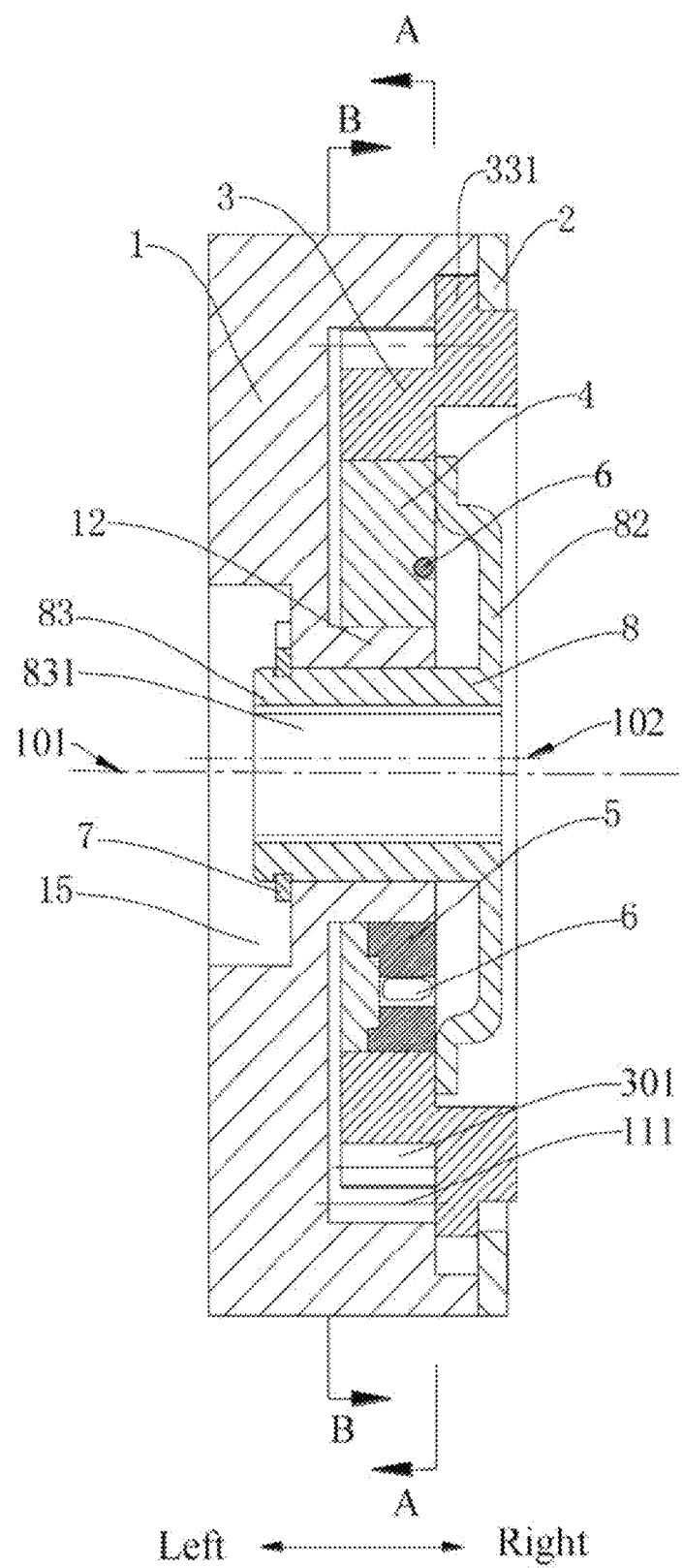
FIG. 3 is a sectional view of a speed reducer according to embodiments of the present technology.

The outer gear 3 is provided and includes, on a peripheral surface, outer teeth 301. For the speed reducer 100, at least part of the outer gear 3 is arranged in the inner gear hole 11 and meshes with the inner gear 1. For example, the outer teeth 301 can mesh with inner teeth 111. The outer gear 3 has a concentric outer gear hole 31. In other words, a central axis of an outer peripheral surface of the outer gear 3 (which may also be called a central axis of the outer gear 3) is coaxial with a central axis of the outer gear hole 31. As shown in FIG. 3, the outer peripheral surface of the outer gear 3 is eccentric relative to the inner gear hole 11; that is, the central axis of the outer gear 3 is parallel to but not coaxial with the central axis of the inner gear 1 (i.e., the central axis of the inner gear hole 11), and part of the outer teeth 301 of the outer gear 3 meshes with part of the inner teeth 111 of the inner gear 1.

The eccentric wheel 4 is rotatably arranged in the outer gear hole 31. For instance, a central axis of an outer peripheral surface of the eccentric wheel 4 is coaxial with the central axis of the outer gear hole 31, the central axis of the outer peripheral surface of the eccentric wheel 4 is parallel to but not coaxial with a rotation axis of the eccentric wheel 4, and the rotation axis of the eccentric wheel 4 is coaxial with the central axis of the inner gear 1 (i.e., the central axis of the inner gear hole 11) and a central axis (a rotation axis) of the drive member 8. The outer gear 3 is driven by the eccentric wheel 4 to rotate around the rotation axis of the eccentric wheel 4 (i.e., the central axis of the inner gear 1, the central axis of the inner gear hole 11), and the outer gear 3 rotates around its own axis simultaneously. That is, the eccentric wheel 4 may drive the outer gear 3 to rotate around the rotation axis of the eccentric wheel 4. As the outer gear 3 meshes with the inner gear 1, the outer gear 3 rotates around its own axis while it rotates, and a rotation axis of autorotation of the outer gear 3 is the central axis of the outer gear 3.

For example, the eccentric wheel 4 rotates clockwise, and drives the outer gear 3 to revolve around the rotation axis of the eccentric wheel 4 in a clockwise direction, while at the same time, the outer gear 3 rotates counterclockwise around its own axis; the eccentric wheel 4 rotates counterclockwise, and drives the outer gear 3 to revolve around the rotation axis of the eccentric wheel 4 in a counterclockwise direction, while at the same time, the outer gear 3 rotates clockwise around its own axis.

The brake block 5 is arranged on the eccentric wheel 4 and is rotatable together with the eccentric wheel 4. For instance, the brake block 5 is movable between a braking position and a release position relative to the eccentric wheel 4. At the braking position, the brake block 5 abuts against the outer gear 3. At the release position, the brake block 5 is separated from the outer gear 3.

The elastic member 6 is coupled to the eccentric wheel 4 and the brake block 5. The elastic member 6 is configured to press the brake block 5 towards the braking position. In other words, the elastic member 6 applies elastic force to the brake block 5, and the elastic force of the elastic member 6 presses the brake block 5 towards the braking position. For example, during the movement of the brake block 5 from the braking position towards the release position, the elastic member 6 is gradually compressed, thereby the elastic member 6 applies elastic force to the brake block 5, and the elastic force presses the brake block 5 towards the braking position.

The drive member 8 is coupled to the eccentric wheel 4. The drive member 8 is configured to drive the eccentric wheel 4, and a rotation axis of the drive member 8 is coaxial with the rotation axis of the eccentric wheel 4.

The speed reducer 100 according to example embodiments of the present technology can automatically realize reverse braking. When the drive member rotates, first the brake block is driven to overcome an elastic force of the elastic member and move to the release position relative to the eccentric wheel to be separated from the outer gear; then the drive member drives the eccentric wheel and the brake block to rotate together, the eccentric wheel drives the outer gear to revolve in the inner gear hole around a central axis of the inner gear hole while rotating around its own axis, and the outer gear serves as an output gear to output a driving force or torque.

When the drive member stops rotating, the elastic member pushes the brake block from the release position to the braking position relative to the eccentric wheel, and the brake block abuts against the outer gear, thereby preventing the eccentric wheel and the brake block from rotating relative to the outer gear, that is, preventing a torque (load) on the outer gear from being reversely transmitted to the drive member through the eccentric wheel to make the drive member rotate. For example, when a motor of a winch stops rotating, a load applied to the outer gear by a drum of the winch cannot be reversely transmitted to the drive member to make the drive member rotate.

The speed reducer according to embodiments of the present technology may realize the automatic reverse braking function with a simple overall structure, a small number of parts, and a small volume, and has the advantages of large braking torque, small consumption of braking friction, low cost, and high braking reliability.

Figure 2:
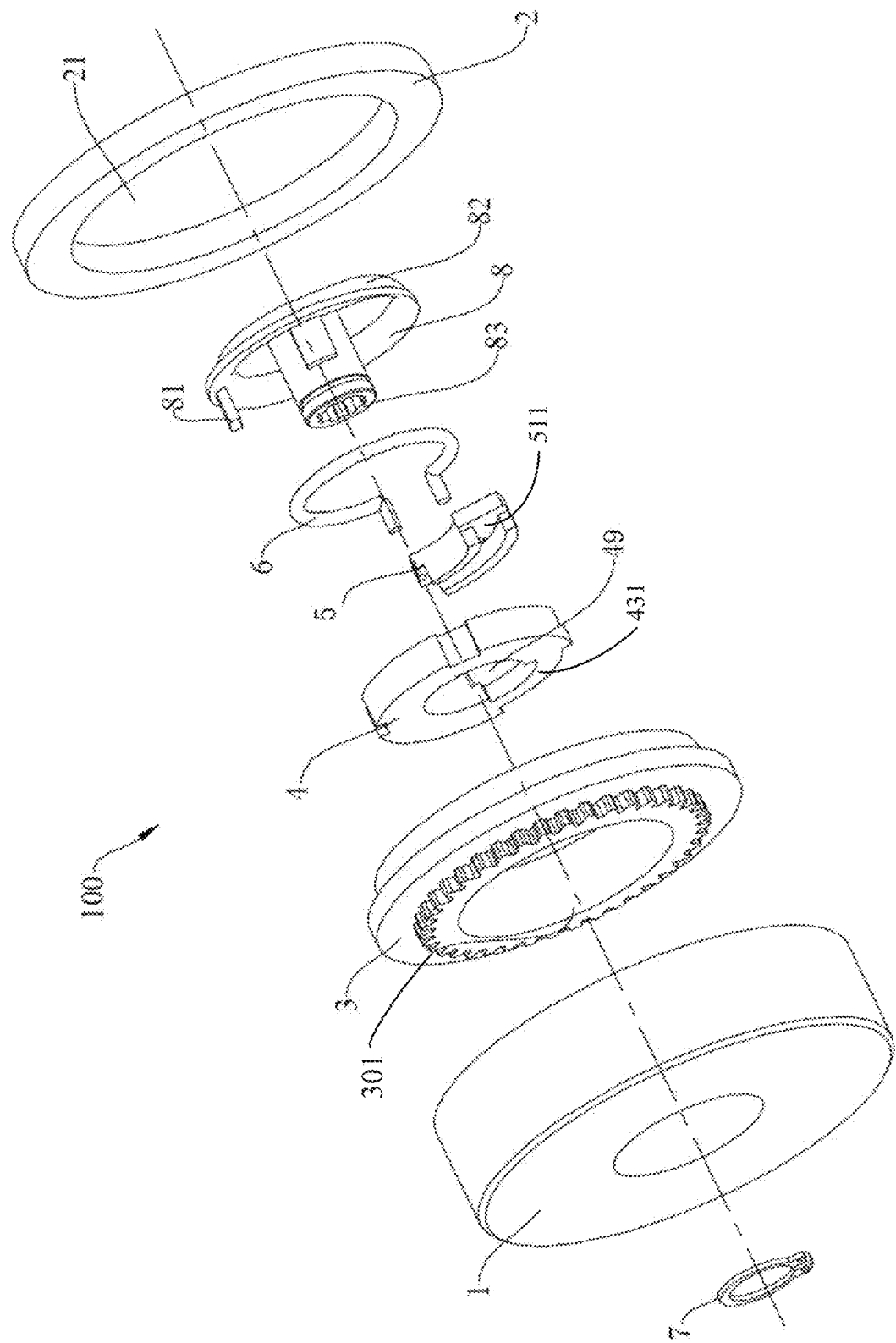
FIG. 2 is a perspective view from another angle of a speed reducer according to embodiments of the present technology.

As shown in FIGS. 1 to 3, the central axis of the inner gear 1, the central axis of the inner gear hole 11, the rotation axis of the eccentric wheel 4, and the rotation axis of the drive member 8 are coaxial, and these axes may be collectively referred to as a main axis 101. The central axis of the outer gear 3, the central axis of the outer gear hole 31, the rotation axis of autorotation of the outer gear 3, and the central axis of the outer peripheral surface of the eccentric wheel 4 are coaxial, and these axes may be collectively referred to as an eccentric axis 102.

When the drive member 8 rotates, the brake block 5 may overcome the elastic force of the elastic member 6 and move to the release position with respect to the eccentric wheel 4, so that the drive member 8 drives the eccentric wheel 4 and the brake block 5 to rotate together. When the drive member 8 stops rotating, the elastic member 6 pushes the brake block 5 to the braking position relative to the eccentric wheel 4, and the brake block 5 abuts against the outer gear 3, thereby preventing the eccentric wheel 4 and the brake block 5 from rotating together. In other words, when the drive member 8 rotates, the brake block 5 moves to the release position, and the drive member 8 may simultaneously drive the eccentric wheel 4 and the brake block 5 to rotate, thus the outer gear 3 is driven to revolve around the rotation axis of the eccentric wheel 4 while rotating around the central axis of the outer gear 3. When the drive member 8 stops rotating, the brake block 5 moves to the braking position under the effect of the elastic member 6, and the brake block 5 abuts against the outer gear 3. At this time, even if there is a load applied to the outer gear 3, the eccentric wheel 4 cannot rotate together with the brake block 5 relative to the outer gear 3; therefore, the outer gear 3, the eccentric wheel 4, and the brake block 5 all cannot rotate, and thus the reverse braking is realized.

For example, the drive member 8 may be coupled to a drive shaft to be driven by the drive shaft to rotate in the counterclockwise direction or in the clockwise direction, the drive shaft may be a shaft of a driver or a shaft coupled to the shaft of the driver, the driver may be a motor, and the drive shaft may be a motor shaft.

For example, the drive member 8 may be coupled to the motor shaft of the motor, and when the drive member 8 is driven to rotate by the motor, the brake block 5 may overcome the elastic force of the elastic member 6 and move to the release position relative to the eccentric wheel 4 to be separated from the outer gear 3. Therefore, the drive member 8 may drive the brake block 5 to rotate together with the eccentric wheel 4, and the drive member 8 then may drive the outer gear 3 to revolve in the inner gear hole 11 around the rotation axis of the eccentric wheel 4, while the outer gear 3 rotates around its own axis simultaneously.

Therefore, the outer gear 3 may also be known as an output gear of the speed reducer 100, and it may be coupled to other parts to drive other parts to rotate. For example, the outer gear 3 may be coupled to a drum of a winch and a joint of a robot. The speed of the drive member 8 is equal to the speed of the eccentric wheel 4. The speed of the eccentric wheel 4 may serve as the input speed of the speed reducer 100, and the revolution speed of the outer gear 3 may serve as the output speed and may be less than the speed of the eccentric wheel 4, thus achieving deceleration.

When the drive member 8 does not rotate, the brake block 5 moves to the braking position relative to the eccentric wheel 4 under the elastic force of the elastic member 6 and abuts against the outer gear 3. The friction between the brake block 5 and the outer gear 3 prevents the eccentric wheel 4 and the brake block 5 from rotating relative to the outer gear 3, and thus prevents rotation and revolution of the outer gear 3.

The speed reducer 100 according to example embodiments of the present technology can automatically realize reverse braking. When the drive member rotates, first the brake block is driven to overcome an elastic force of the elastic member and move to the release position relative to the eccentric wheel to be separated from the outer gear; then the drive member drives the eccentric wheel and the brake block to rotate together, the eccentric wheel drives the outer gear to revolve in the inner gear hole around a central axis of the inner gear hole while rotating around its own axis, and the outer gear serves as an output gear to output a torque.

When the drive member stops rotating, the elastic member pushes the brake block from the release position to the braking position relative to the eccentric wheel, and the brake block abuts against the outer gear, thereby preventing the eccentric wheel and the brake block from rotating relative to the outer gear, that is, preventing a torque (load) applied to the eccentric wheel by the outer gear from making the eccentric wheel rotate, so that the eccentric wheel cannot transmit the torque to the drive member to make the drive member rotate. For example, when a motor of a winch stops rotating, a load applied to the eccentric wheel by a drum of the winch through the outer gear cannot drive the eccentric wheel to rotate, so that the outer gear cannot rotate, and at the same time, the eccentric wheel cannot make the drive member rotate.

It should be understood that in the embodiments of the present technology, for example, "reverse" in "reverse braking" refers to a direction in which the torque applied to the outer gear is transmitted towards the drive member, and correspondingly, "forward" refers to a direction in which the torque of the drive member is transmitted towards the outer gear.

The speed reducer 100 according to embodiments of the present technology may realize the automatic reverse braking function with a simple overall structure, a small number of parts, and a small volume, and has the advantages of large braking torque, small consumption of braking friction, low cost, and high braking reliability.

In some embodiments, as shown in FIGS. 1 to 17, the eccentric wheel 4 is provided with a toggle slot 41, the drive member 8 is provided with a toggle block 81, and the toggle block 81 is movably fitted in the toggle slot 41. When the drive member 8 rotates in one of a clockwise direction and a counterclockwise direction, the toggle block 81 overcomes the elastic force of the elastic member 6 and pushes the brake block 5 to the release position to drive the eccentric wheel 4 and the brake block 5 to rotate together. When the drive member 8 rotates in the other one of the clockwise direction and the counterclockwise direction, the toggle block 81 drives the eccentric wheel 4 to rotate, and thus the relative rotation occurs between the eccentric wheel 4 and the brake block 5. The brake block 5 overcomes the elastic force of the elastic member 6 and moves to the release position, and then the toggle block 81 drives the eccentric wheel 4 and the brake block 5 to rotate together.

Figure 6:
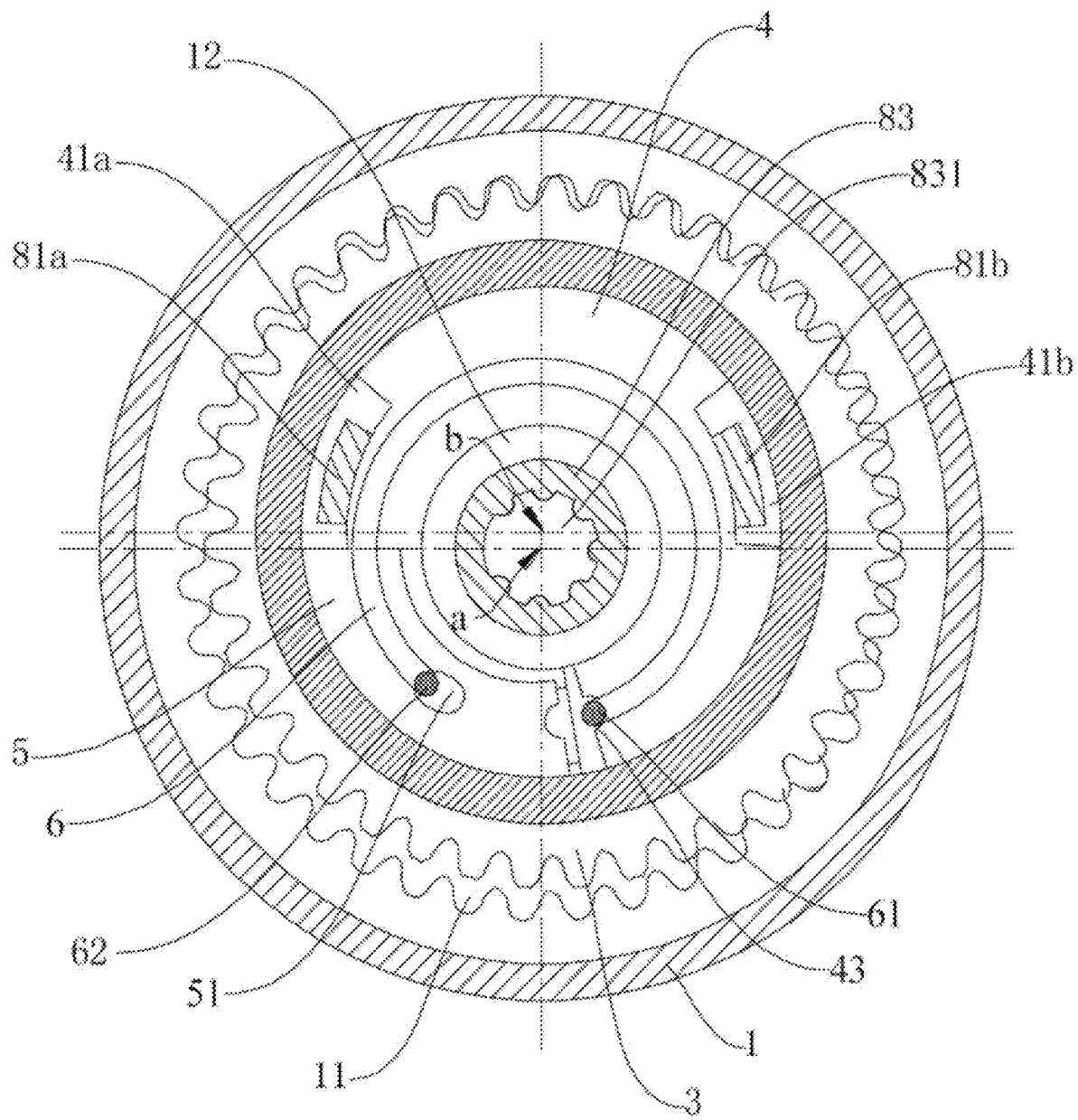
FIG. 6 is a sectional view of a speed reducer according to embodiments of the present technology taken along line A-A in FIG. 3.
Figure 7:
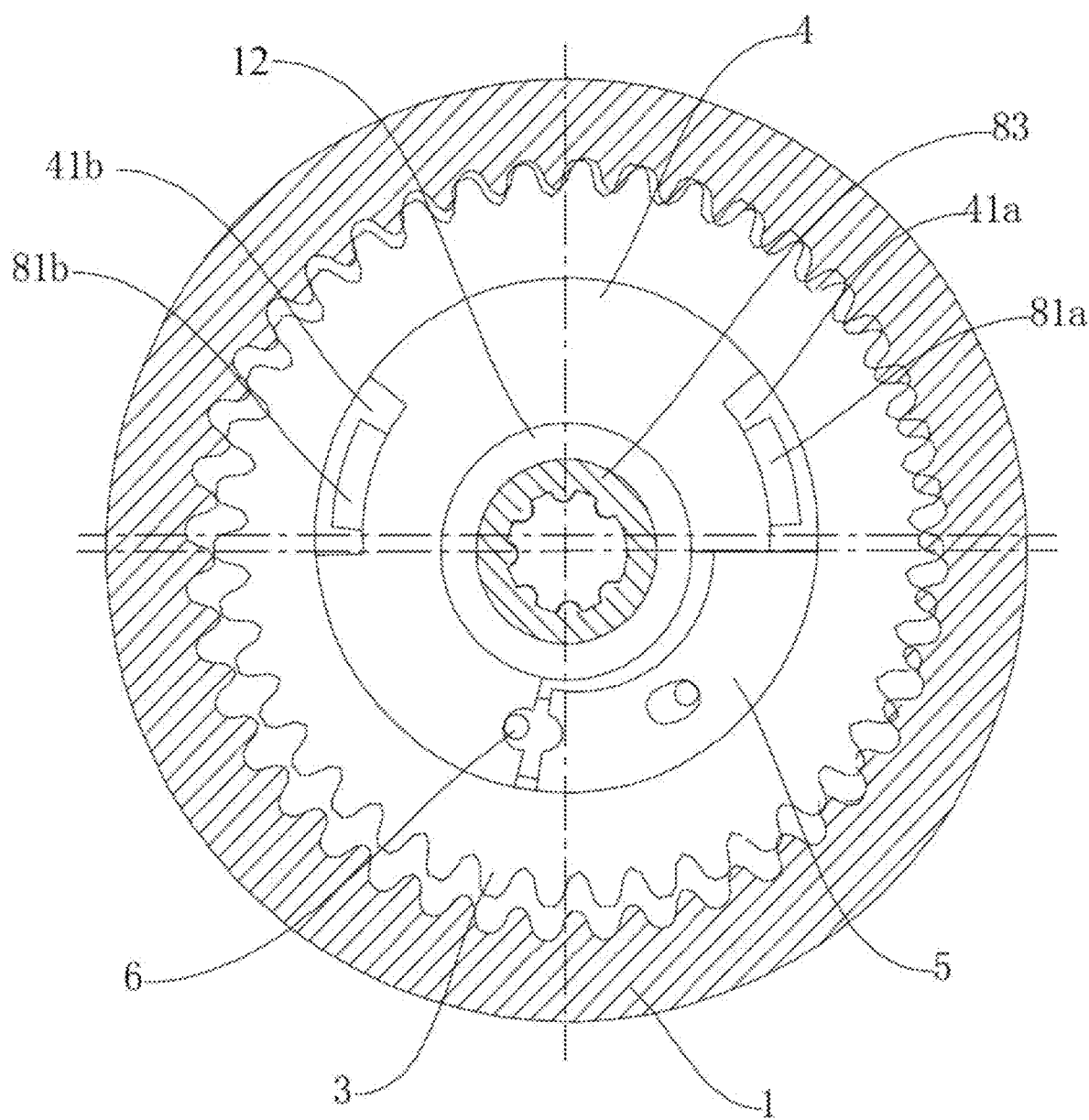
FIG. 7 is a sectional view of a speed reducer according to embodiments of the present technology taken along line B-B in FIG. 3.
Figure 8:
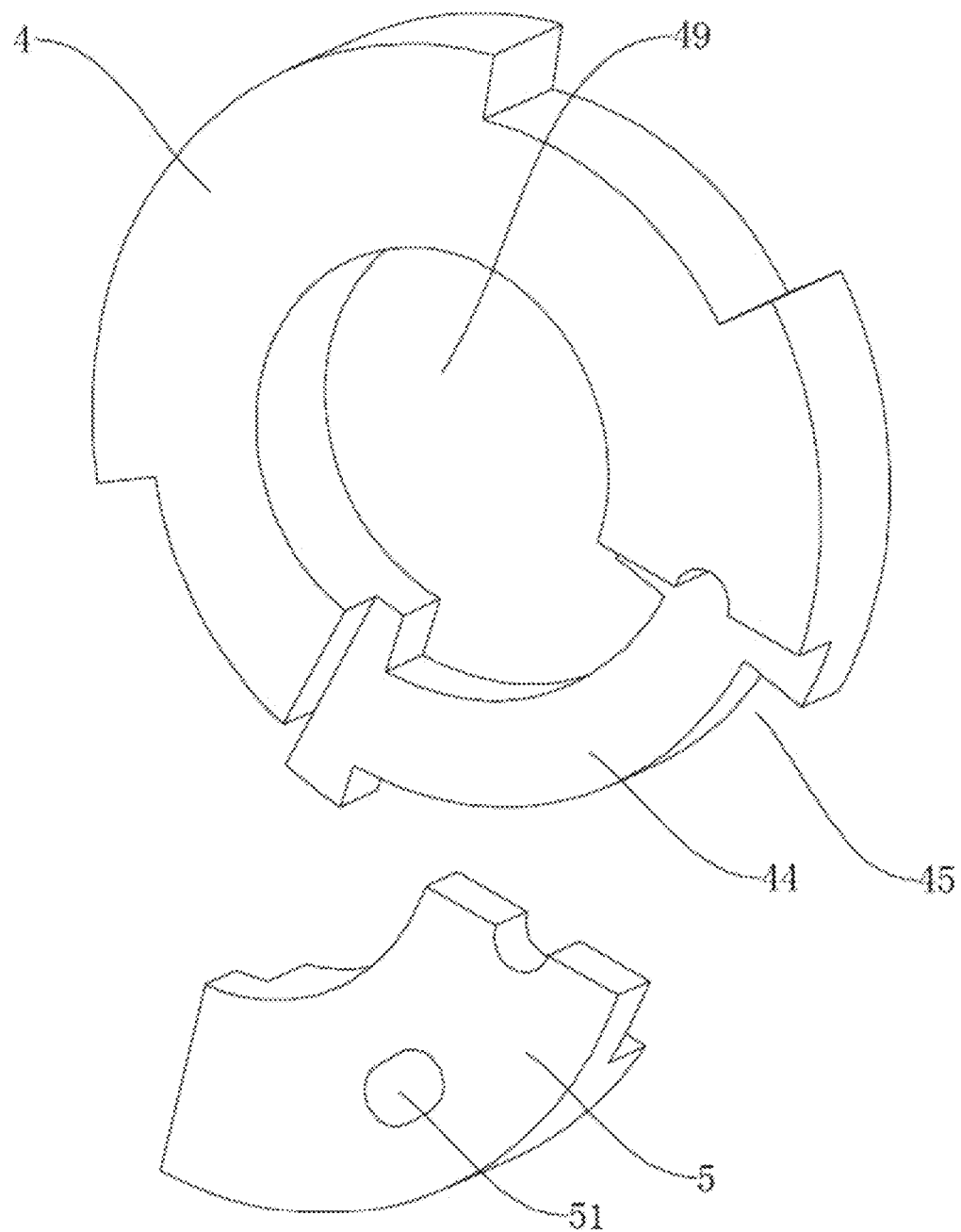
FIG. 8 is a schematic view of coordination between a brake block and an eccentric wheel of a speed reducer according to embodiments of the present technology, in which the brake block is in a release position.
Figure 9:
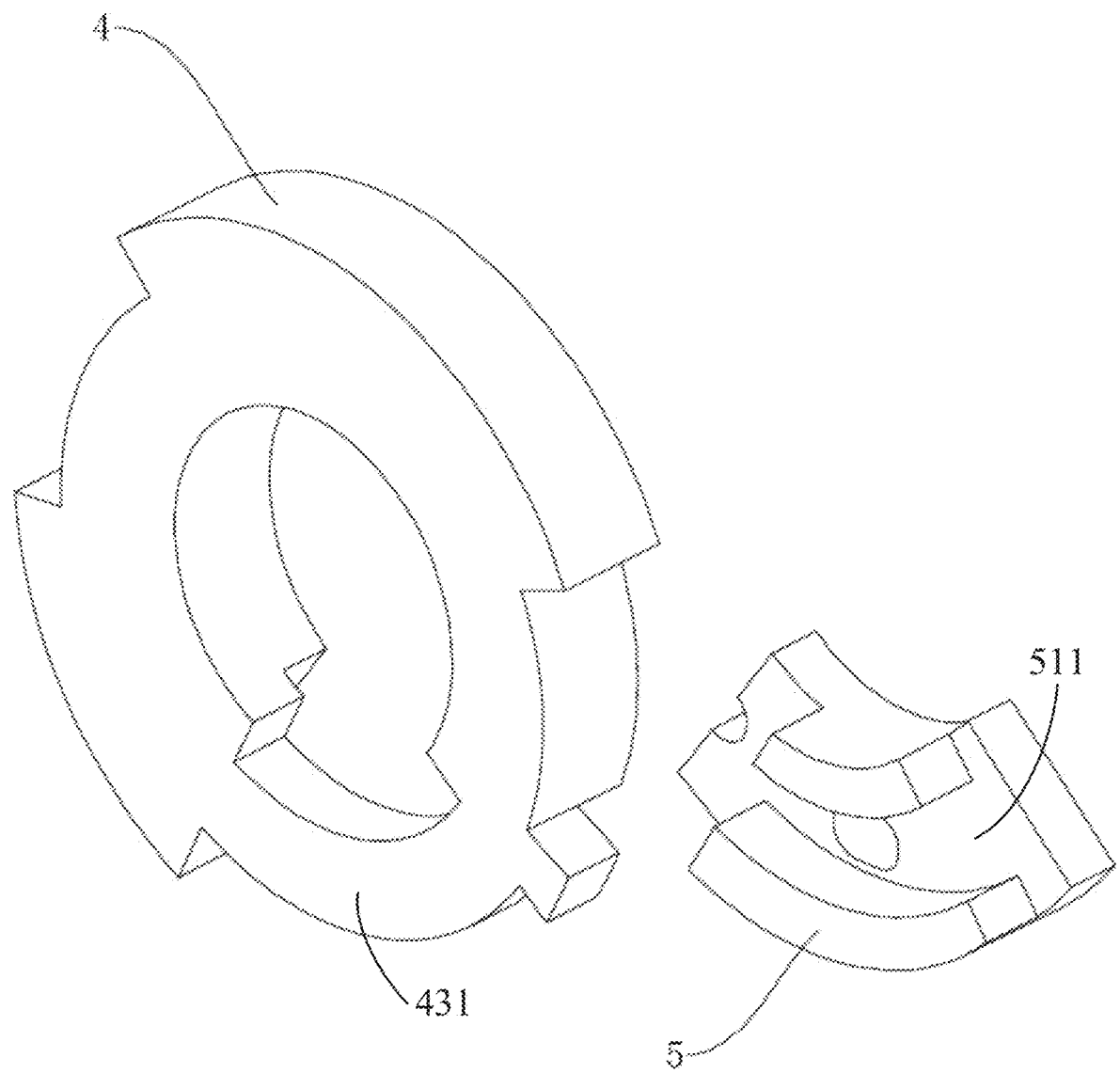
FIG. 9 is a perspective view of a brake block and an eccentric wheel of a speed reducer according to embodiments of the present technology.
Figure 10:
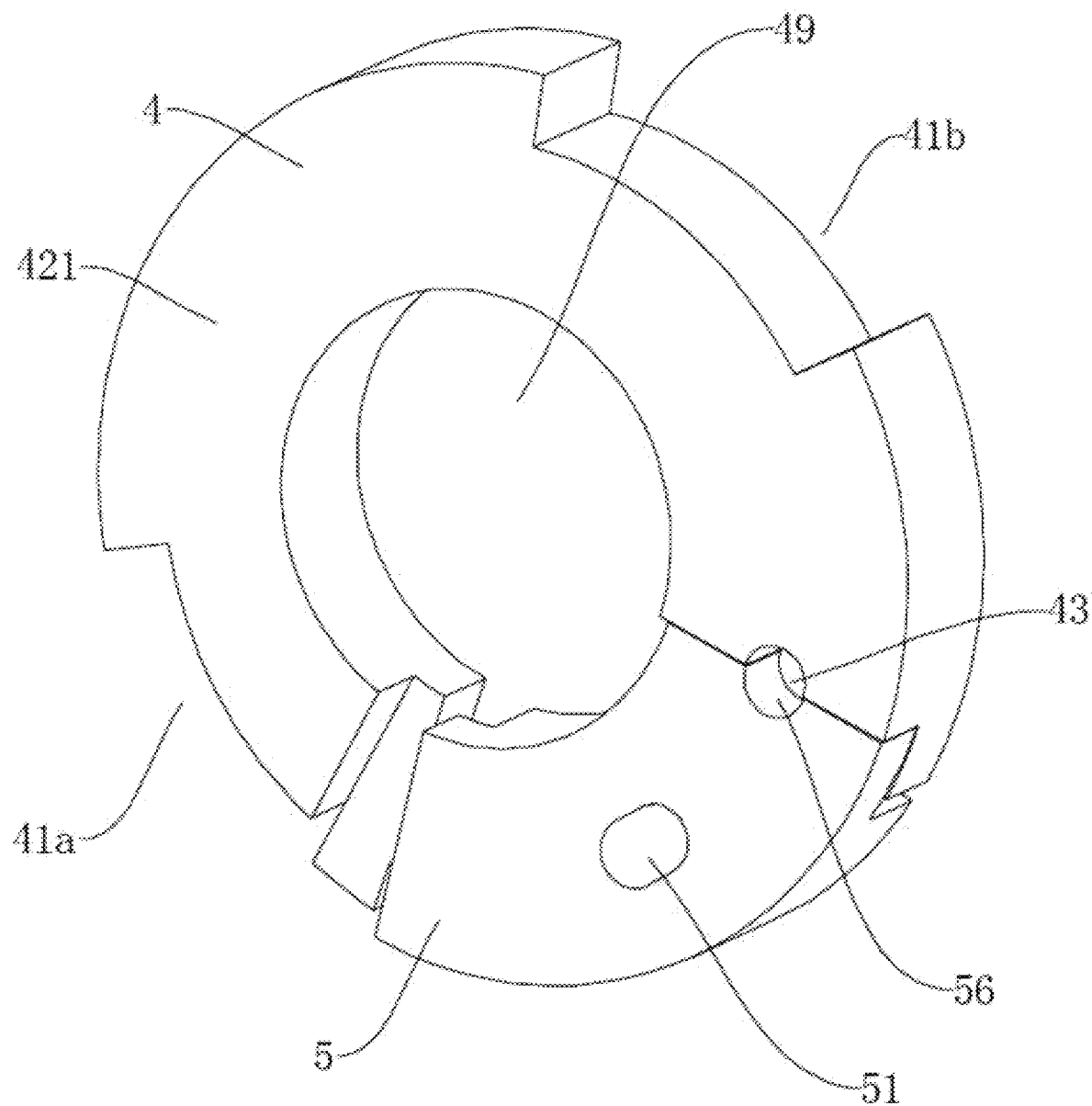
FIG. 10 is another schematic view of coordination between a brake block and an eccentric wheel of a speed reducer according to embodiments of the present technology.

In some examples, as shown in FIG. 6, when the drive member 8 rotates in the counterclockwise direction, the toggle block 81 overcomes the elastic force of the elastic member 6 and pushes the brake block 5 to the release position to drive the eccentric wheel 4 and the brake block 5 to rotate together. In other words, the drive member 8 directly pushes the brake block 5 through the toggle block 81, so that the brake block 5 overcomes the elastic force of the elastic member 6 and moves to the release position relative to the eccentric wheel 4, and then the force is applied to the eccentric wheel 4 through the toggle block 81 directly or through the brake block 5 to drive the eccentric wheel 4 and the brake block 5 to rotate together. It is noted that FIG. 6 shows a sectional view of the speed reducer 100 according to some embodiments of the present technology taken along line A-A shown in FIG. 3, and FIG. 7 shows a sectional view of the speed reducer 100 taken along line B-B shown in FIG. 3.

In other examples, as shown in FIG. 6, when the drive member 8 rotates in the clockwise direction, the toggle block 81 drives the eccentric wheel 4 to rotate, and the relative rotation occurs between the eccentric wheel 4 and the brake block 5, whereby the brake block 5 overcomes the elastic force of the elastic member 6 and moves to the release position, and then the toggle block 81 drives the eccentric wheel 4 and the brake block 5 to rotate together. In other words, the drive member 8 drives the eccentric wheel 4 to rotate through the toggle block 81, whereby the brake block 5 overcomes the elastic force of the elastic member 6 and moves to the release position, and then the force is directly applied to the eccentric wheel 4 through the toggle block 81 to drive the eccentric wheel 4 and the brake block 5 to rotate together.

In some embodiments, as shown in FIGS. 1 to 17, the toggle slot 41 includes a first toggle slot 41a and a second toggle slot 41b, and the toggle block 81 includes a first toggle block 81a and a second toggle block 81b. The first toggle block 81a is movably fitted in the first toggle slot 41a, and the second toggle block 81b is movably fitted in the second toggle slot 41b. The brake block 5 corresponds to the first toggle slot 41a, that is, the brake block 5 may be driven by the first toggle block 81a fitted in the first toggle slot 41a. When the drive member 8 rotates in the clockwise direction or the counterclockwise direction, the first toggle block 81a moves in the first toggle slot 41a around the rotation axis of the drive member 8, and the second toggle block 81b moves in the second toggle slot 41b around the rotation axis of the drive member 8.

In some examples, when the drive member 8 rotates counterclockwise, the first toggle block 81a overcomes the elastic force of the elastic member 6 and is in direct contact with the brake block 5 to push the brake block 5 to the release position.

Specifically, as shown in FIG. 3, the brake block 5 is in the braking position, and the brake block 5 abuts against the outer gear 3, that is, the brake block 5 abuts against a peripheral wall surface of the outer gear hole 31, and a minimum gap therebetween is zero. When the drive member 8 rotates in a counterclockwise direction in FIG. 3, the first toggle block 81a rotates in the first toggle slot 41a in the counterclockwise direction until it is in contact with an end face of the brake block 5 (an upper end face in FIG. 6), and then, the first toggle block 81a applies thrust to the brake block 5 to overcome the elastic force of the elastic member 6 and pushes the brake block 5 to the release position. The brake block 5 is separated from the outer gear 3, that is, separated from the peripheral wall surface of the outer gear hole 31, and the minimum gap therebetween is greater than zero. Then, the first toggle block 81a pushes the brake block 5 and the eccentric wheel 4 to rotate together in the counterclockwise direction, thereby the outer gear 3 is driven to revolve counterclockwise around the rotation axis of the eccentric wheel 4, and the outer gear 3 rotates clockwise around its own central axis simultaneously.

When the first toggle block 81a pushes the brake block 5 from the braking position to the release position, the second toggle block 81b rotates in the counterclockwise direction in the second toggle slot 41b, and when the brake block 5 reaches the release position, the second toggle block 81b is spaced apart from an end wall surface of the second toggle slot 41b (an upper end wall surface in FIG. 6). In some embodiments, the second toggle block 81b may be in contact with the end wall surface of the second toggle slot 41b, but the second toggle block 81b may not apply force on the eccentric wheel 4, and the eccentric wheel 4 and the brake block 5 rotate together in the counterclockwise direction under the effect of the first toggle block 81a. As a result, the machining accuracy and assembly accuracy requirements for the drive member 8 and the eccentric wheel 4 are low, and the manufacturing cost is reduced.

In some embodiments, when the drive member 8 rotates clockwise, the second toggle block 81b drives the eccentric wheel 4 to rotate in the clockwise direction, and the brake block 5 overcomes the elastic force of the elastic member 6 and moves to the release position.

Specifically, when the drive member 8 rotates in a clockwise direction in FIG. 6, the second toggle block 81b rotates in the second toggle slot 41b in the clockwise direction until it is in contact with an end face of the second toggle slot 41b (a lower end face in FIG. 6), the second toggle block 81b applies thrust to the eccentric wheel 4 to push the eccentric wheel 4 to rotate in the clockwise direction, and the relative rotation occurs between the eccentric wheel 4 and the brake block 5, whereby the brake block 5 overcomes the elastic force of the elastic member 6 and moves to the release position. Subsequently, the second toggle block 81b drives the eccentric wheel 4 and the brake block 5 to rotate together in the clockwise direction, thereby the outer gear 3 is driven to revolve clockwise around the rotation axis of the eccentric wheel 4, and the outer gear 3 rotates counterclockwise around its own central axis simultaneously.

When the brake block 5 overcomes the elastic force of the elastic member 6 and moves from the braking position to the release position, the first toggle block 81a is spaced apart from an end wall surface of the first toggle slot 41a (an upper end wall surface in FIG. 6). In some embodiments, the first toggle block 81a may be in contact with the end wall surface of the first toggle slot 41a, but the first toggle block 81a may not apply force on the eccentric wheel 4, and the eccentric wheel 4 and the brake block 5 rotate together in the clockwise direction under the effect of the second toggle block 81b.

In some specific examples, as shown in FIGS. 1 to 17, there is one first toggle slot 41a, one second toggle slot 41b, one first toggle block 81a, one second toggle block 81b, one brake block 5, and one elastic member 6. The first toggle block 81a is fitted in the first toggle slot 41a and corresponds to the brake block 5, and the second toggle block 81b is fitted in the second toggle slot 41b and does not correspond to the brake block 5, that is, the second toggle block 81b is not in direct contact with the brake block 5.

In optional embodiments, the first toggle slot 41a, the second toggle slot 41b, the first toggle block 81a, the second toggle block 81b, the brake block 5, and the elastic member 6 each may be a plurality.

In some embodiments, as shown in FIGS. 1 to 14, the toggle slot 41 is in the outer peripheral surface of the eccentric wheel 4, and extends for a predetermined length along a circumferential direction of the outer peripheral surface of the eccentric wheel 4 and penetrates the eccentric wheel 4 along an axial direction of the eccentric wheel 4. The toggle block 81 of the drive member 8 extends into and fits in the toggle slot 41 along the axial direction of the eccentric wheel 4.

In other embodiments, the eccentric wheel 4 has opposite first end 421 (a front end face facing the observer in FIG. 12) and second end 422 (a rear end away from the observer in FIG. 12) in the axial direction of the eccentric wheel 4, and the toggle slot 41 is at a junction of an end face of the first end 421 of the eccentric wheel 4 and the outer peripheral surface of the eccentric wheel 4. In other words, the toggle slot 41 is concave to a predetermined depth from an end face of the first end 421 of the eccentric wheel 4 towards the second end 422 of the eccentric wheel 4 and an outer peripheral surface of the toggle slot 41 is open, so that the toggle slot 41 does not penetrate the eccentric wheel 4 along the axial direction of the eccentric wheel 4, and the toggle block 81 of the drive member 8 extends into and fits in the toggle slot 41 from the first end 421 of the eccentric wheel 4 along the axial direction of the eccentric wheel 4.

In some examples, as shown in FIGS. 8 to 14, the toggle slot 41 is an arc-shaped groove extending along the circumferential direction of the outer peripheral surface of the eccentric wheel 4, specifically, an inner peripheral wall surface of the toggle slot 41 is arc-shaped, and a central axis of the inner peripheral wall surface of the toggle slot 41 is coaxial with the central axis of the outer peripheral surface of the eccentric wheel 4. In the examples shown in FIGS. 1 to 14, there are two toggle slots 41, namely, the first toggle slot 41a and the second toggle slot 41b, and the first toggle slot 41a and the second toggle slot 41b are spaced apart from each other along the circumferential direction of the eccentric wheel 4.

As shown in FIGS. 1-2 and FIGS. 6-7, the toggle block 81 is configured as an arc shape matched with the toggle slot 41, and an outer peripheral surface and an inner peripheral surface of the toggle block 81 each are arc-shaped. The inner peripheral surface of the toggle block 81 may be slidably fitted in the inner peripheral wall surface of the toggle slot 41, and the outer peripheral surface of the toggle block 81 and an outer peripheral edge of the toggle slot 41 may have a gap in a radial direction of the eccentric wheel 4. It should be understood that the embodiments of the present technology are not limited to this.

In some embodiments, as shown in FIGS. 1 to 4, the drive member 8 may be configured as a drive disc, the drive disc includes a disc body 82 and a disc hub 83 located at a center of the disc body 82, and the toggle block 81 is arranged on the disc body 82 and extends from the disc body 82 along an axial direction of a drive disc towards the eccentric wheel 4 and extends into the toggle slot 41. The inner gear 1 has a central flange 12 extending axially in the inner gear hole 11. The central flange 12 has a concentric flange hole 13, and the disc hub 83 is rotatably fitted in the flange hole 13. The eccentric wheel 4 has an eccentric wheel hole 49, and the eccentric wheel hole 49 is coaxial with the inner gear 1, that is, a central axis of the eccentric wheel hole 49 is coaxial with the central axis of the inner gear 1. As mentioned above, the central axis of the eccentric wheel hole 49 is the main axis 101. The central flange 12 is rotatably fitted in the eccentric wheel hole 49 and is coaxial with the eccentric wheel hole 49.

Figure 4:
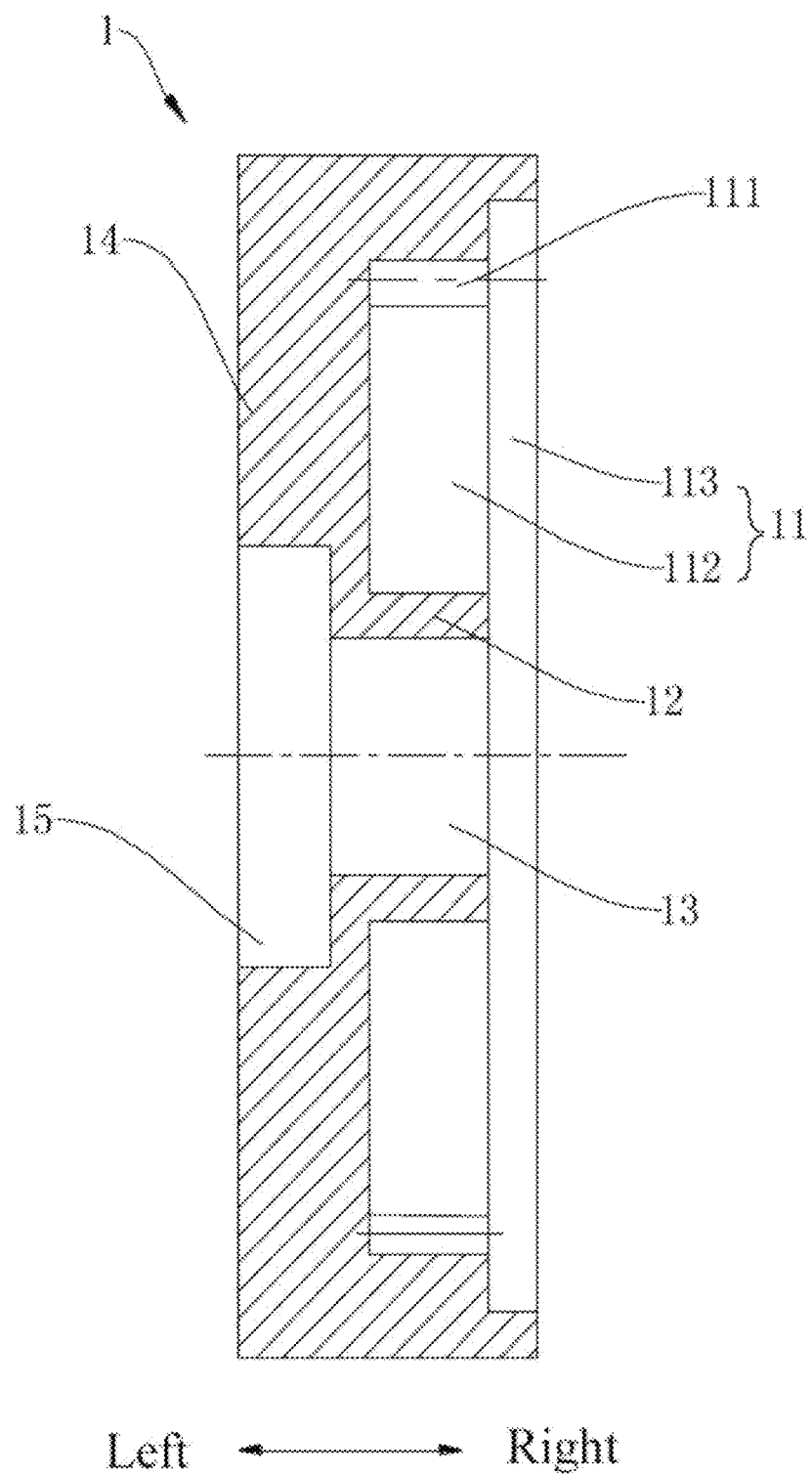
FIG. 4 is an axial sectional view of an inner gear of a speed reducer according to embodiments of the present technology.

In some examples, as shown in FIGS. 3 and 4, the central flange 12 is coupled to an end wall 14 of the inner gear 1 and extends towards the right along an axis direction of the inner gear hole 11, the central flange 12 is rotatably fitted in the eccentric wheel hole 49, and a right end face of the central flange 12 is flush with a right end face of the eccentric wheel 4. In some embodiments, the speed reducer 100 may optionally include a snap ring 7. As shown in FIG. 3, the disc hub 83 extends to the left from the center of the disc body 82, the disc hub 83 is rotatably fitted in the flange hole 13 of the central flange 12, and a left end of the disc hub 83 extends out the flange hole 13 and is connected by the snap ring 7. A middle part of a left end face of the end wall 14 of the inner gear 1 is provided with a counter bore 15 in connection with the flange hole 13, and a diameter of the counter bore 15 is greater than a diameter of the flange hole 13 to form a step surface. The left end of the disc hub 83 extending out the flange hole 13 and the snap ring 7 are located in the counter bore 15, which facilitates the connection between the speed reducer 100 and the motor. The snap ring 7 abuts against the step surface to limit the central flange 12 and the disc hub 83 in the axial direction.

In the example shown in FIG. 3, the disc hub 83 may be in clearance fit with the flange hole 13. In some embodiments, the disc hub 83 is rotatably supported in the flange hole 13 through bearings.

Figure 14:
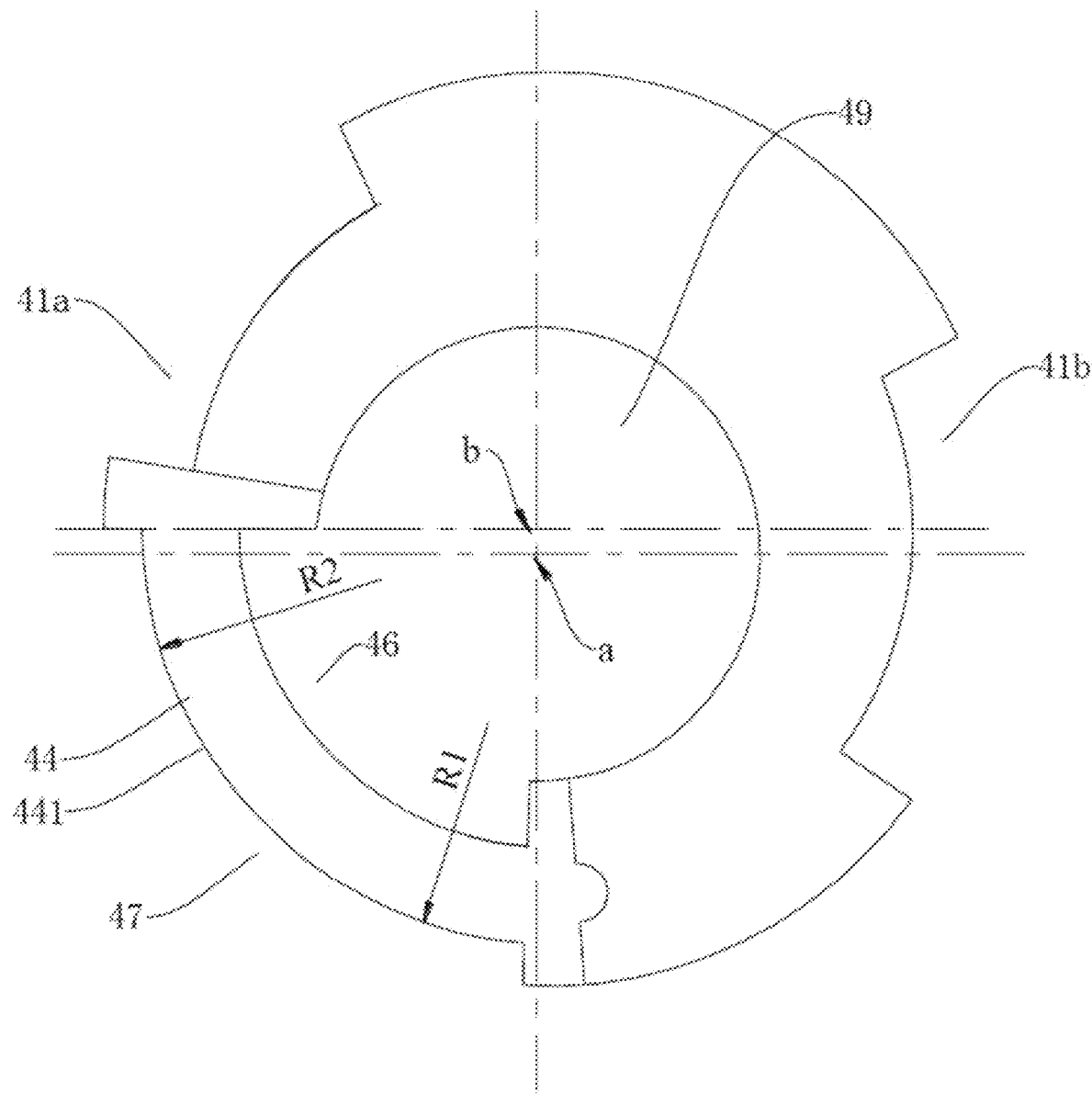
FIG. 14 is a plan view of an eccentric wheel of a speed reducer according to embodiments of the present technology.

As shown in FIGS. 3 to 6, the central axis of the eccentric wheel hole 49, a central axis of the central flange 12, a central axis of the flange hole 13, a central axis of the disc hub 83, and a rotation axis of the disc hub 83 each are coaxial with the central axis of the inner gear 1. As shown in FIGS. 6 and 14, a center of the inner gear 1, a center of the eccentric wheel hole 49, a center of the central flange 12, and a center of the disc hub 83 each are a center a; and a center of the outer gear 3 and a center of the outer peripheral surface of the eccentric wheel 4 each are a center b.

As shown in FIGS. 1 to 3, the disc hub 83 is provided with a disc hole 831, the disc hole 831 is suitable for matching with the drive shaft, such as the motor shaft of the motor, and the disc hole 831 may penetrate the disc hub 83. In some embodiments, the disc hole 831 may be a blind hole. The motor shaft is fitted in the disc hole 831 to drive the drive member 8 to rotate.

In the example shown in FIG. 3, the disc hole 831 penetrates the disc hub 83 along an axial direction of the disc hub 83. An end of the drive shaft may extend into and fit in the disc hole 831 from a left side of the speed reducer 100, and may also extend into and fit in the disc hole 831 from a right side of the speed reducer 100. In the examples shown in FIGS. 1 and 2, a spline is arranged on an inner peripheral surface of the disc hole 831 of the drive member 8, and the drive shaft may also be provided with a spline, so that the drive member 8 is splined to the drive shaft.

In some embodiments, as shown in FIGS. 1 to 3, the speed reducer 100 can include a cover plate 2, the inner gear 1 has a first end (a left end in FIGS. 3 and 4) and a second end (a right end in FIGS. 3 and 4), the inner gear 1 has the first end with the end wall 14, the second end of the inner gear 1 is open, and the cover plate 2 is arranged at the second end of the inner gear 1 to limit the outer gear 3, that is, the cover plate 2 limits the inner gear 1 and the outer gear 3 in an axial direction of the inner gear 1.

In some examples, as shown in FIGS. 3 and 4, the inner gear hole 11 of the inner gear 1 includes an inner gear hole segment 112 and a limiting hole segment 113, the inner teeth 111 of the inner gear 1 form on a peripheral wall of the inner gear hole segment 112, and a diameter of the limiting hole segment 113 is greater than a diameter of the inner gear hole segment 112.

Figure 5:
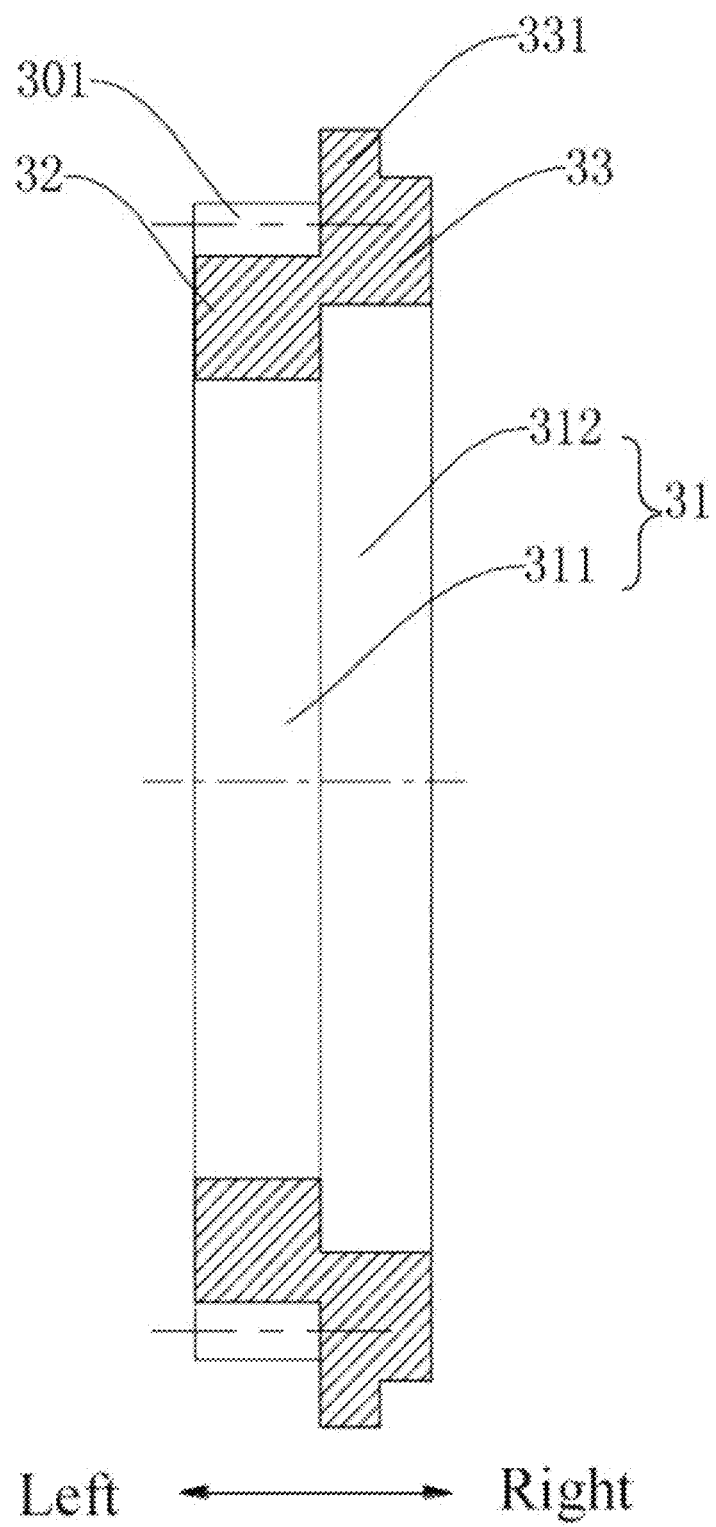
FIG. 5 is an axial sectional view of an outer gear of a speed reducer according to embodiments of the present technology.

As shown in FIGS. 1, 2, and 5, in some embodiments where the speed reducer 100 includes the cover plate 2, the cover plate 2 can have a cover plate hole 21, and the outer gear 3 can include an outer gear section 32 and a mating section 33. The outer teeth 301 of the outer gear 3 is formed on an outer peripheral surface of the outer gear section 32, and the outer gear section 32 fits in and meshes with the inner gear hole segment 112. The mating section 33 is provided on an outer peripheral surface with a limiting flange 331, which is rotatably fitted in the limiting hole segment 113, the mating section 33 is rotatably fitted in the cover plate hole 21 of the cover plate 2, and the cover plate 2 stops the limiting flange 331, thereby the axial limit between the inner gear 1 and the outer gear 3 is realized. It should be understood that the limit structure of the inner gear 1 and the outer gear 3 is not limited to this.

Further, as shown in FIGS. 3 and 5, the outer gear hole 31 includes an outer gear hole segment 311 and a mating hole segment 312, a diameter of the mating hole segment 312 is greater than a diameter of the outer gear hole segment 311, and the eccentric wheel 4 is rotatably fitted in the outer gear hole segment 311. The disc body 82 of the drive member 8 is located in the mating hole segment 312, and the disc hub 83 of the drive member 8 is rotatably fitted in the flange hole 13 of the central flange 12 of inner gear 1.

In the examples shown in FIGS. 3 and 5, the outer gear hole segment 311 is located on a left side of the mating hole segment 312 and is coaxial with it, the outer gear hole segment 311 is arranged in the outer gear section 32 of the outer gear 3, and the mating hole segment 312 is located in the mating section 33 of the outer gear 3, so as to provide space for the assembly of the disc body 82 of the drive disc.

In some embodiments, as shown in FIGS. 1 to 17, the end face of the first end 421 of the eccentric wheel 4 is provided with a first insertion hole 43, and the brake block 5 is provided with a second insertion hole 51. As shown in FIGS. 1 to 3, the elastic member 6 is a rod-shaped arc spring, in other words, a main body of the spring is roughly open arc-shaped, and a first end and a second end of the spring extend out for a predetermined length roughly orthogonal to a plane where the main body is located, facilitating the connection between the brake block 5 and the eccentric wheel 4. The elastic member 6 has a first end 61 fitted in the first insertion hole 43, and the elastic member 6 has a second end 62 fitted in the second insertion hole 51. The spring exerts an elastic force to the brake block 5 to press the braking position towards the brake block 5 frequently. In the process of the brake block 5 moving from the braking position towards the release position, the first end 61 and the second end 62 of the elastic member 6 are close to each other, and the spring is gradually compressed. In other optional embodiments, the spring may also be gradually stretched as the brake block 5 moves from the braking position towards the release position.

It should be understood that the elastic member 6 is not limited to the rod-shaped spring, for example, it may be an elastic piece or other forms.

Figure 11:
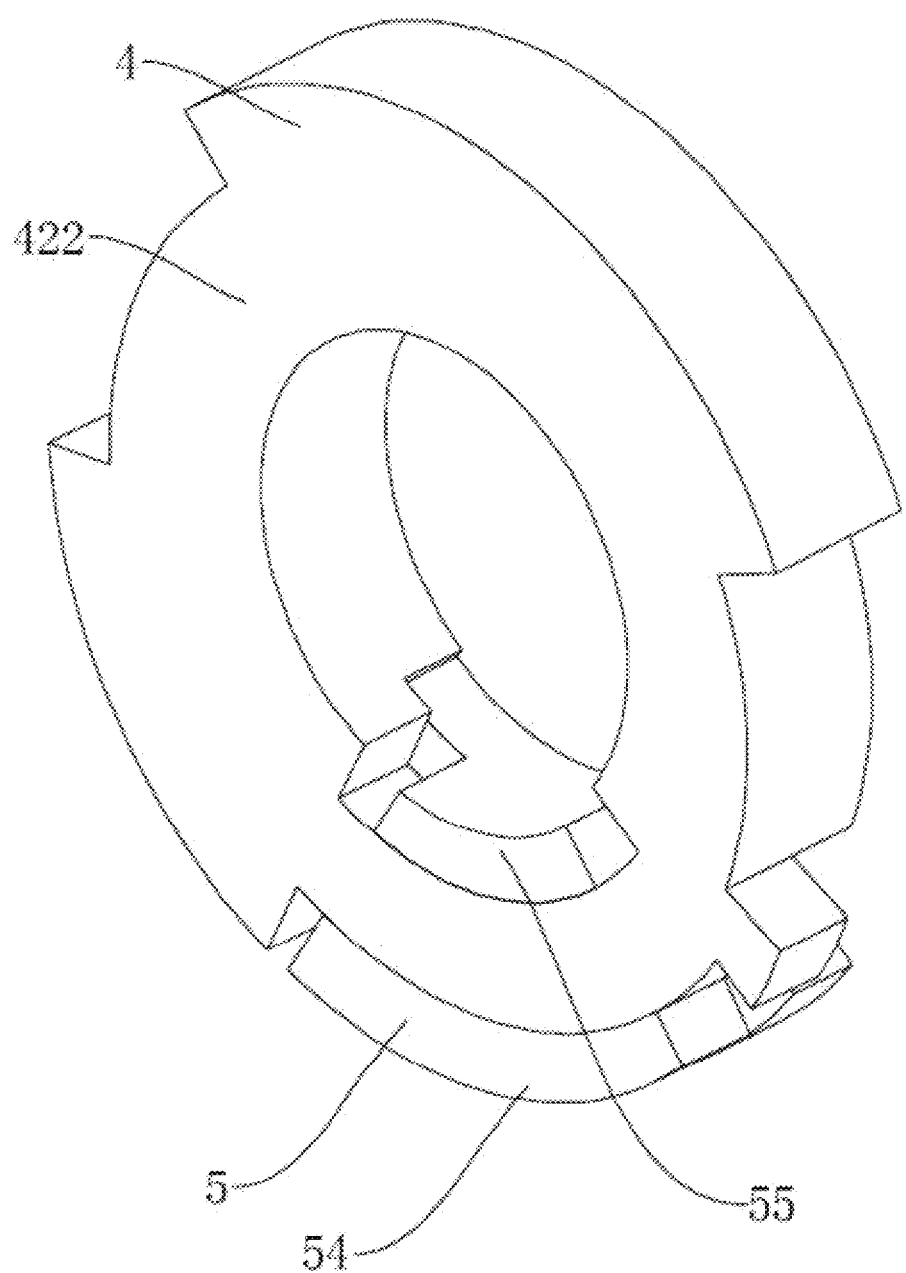
FIG. 11 is another perspective view of a brake block and an eccentric wheel of a speed reducer according to embodiments of the present technology.

In the examples shown in FIGS. 1 to 17, the first insertion hole 43 of the eccentric wheel 4 is a first half hole, and the brake block 5 is provided with a second half hole 56. In the release position, the first half hole abuts against the second half hole 56 in the circumferential direction of the eccentric wheel 4 to form a circular hole (as shown in FIG. 11), and in the braking position, the first half hole is separated from the second half hole 56. It should be understood that a first end of the spring is always fitted in the first half hole, and the first half hole has a limiting effect on the first end of the spring.

Further, as shown in FIG. 3, an end face of the eccentric wheel 4 may be provided with a first arc-shaped groove, an end face of the brake block 5 may be provided with a second arc-shaped groove, and the first arc-shaped groove and the second arc-shaped groove are opposite each other for accommodating the elastic member 6.

It should be understood that the connection between the elastic member 6, the brake block 5, and the eccentric wheel 4 is not limited to the above embodiments, as long as the elastic member 6 may move the brake block 5 from the release position to the braking position when the drive member 8 stops rotating.

For example, in some example embodiments, the first insertion hole 43 of the eccentric wheel 4 is the circular hole extending from the end face of the first end 421 of the eccentric wheel 4 towards the second end, and the first end 61 of the elastic member 6 is fitted in the first insertion hole 43.

In some embodiments, the eccentric wheel 4 is provided with one of a guide rail 431 and a guide groove 511, the brake block 5 is provided with the other of the guide rail 431 and the guide groove 511, and the guide rail 431 is slidably fitted in the guide groove 511. When the brake block 5 moves between the braking position and the release position, the guide rail 431 slides relative to the guide groove 511, to guide the relative movement between the eccentric wheel 4 and the brake block 5.

In some embodiments, as shown in FIGS. 8 to 17, the guide rail 431 is arranged on the eccentric wheel 4, the guide groove 511 is in the brake block 5, and the guide rail 431 and the guide groove 511 each may be arc-shaped; that is, the guide rail 431 is configured as an arc-shaped guide rail 44, the guide groove 511 is configured as an arc-shaped guide groove 52 matched with the arc-shaped guide rail 44, and the arc-shaped guide rail 44 is slidably fitted in the arc-shaped guide groove 52.

Figure 12:
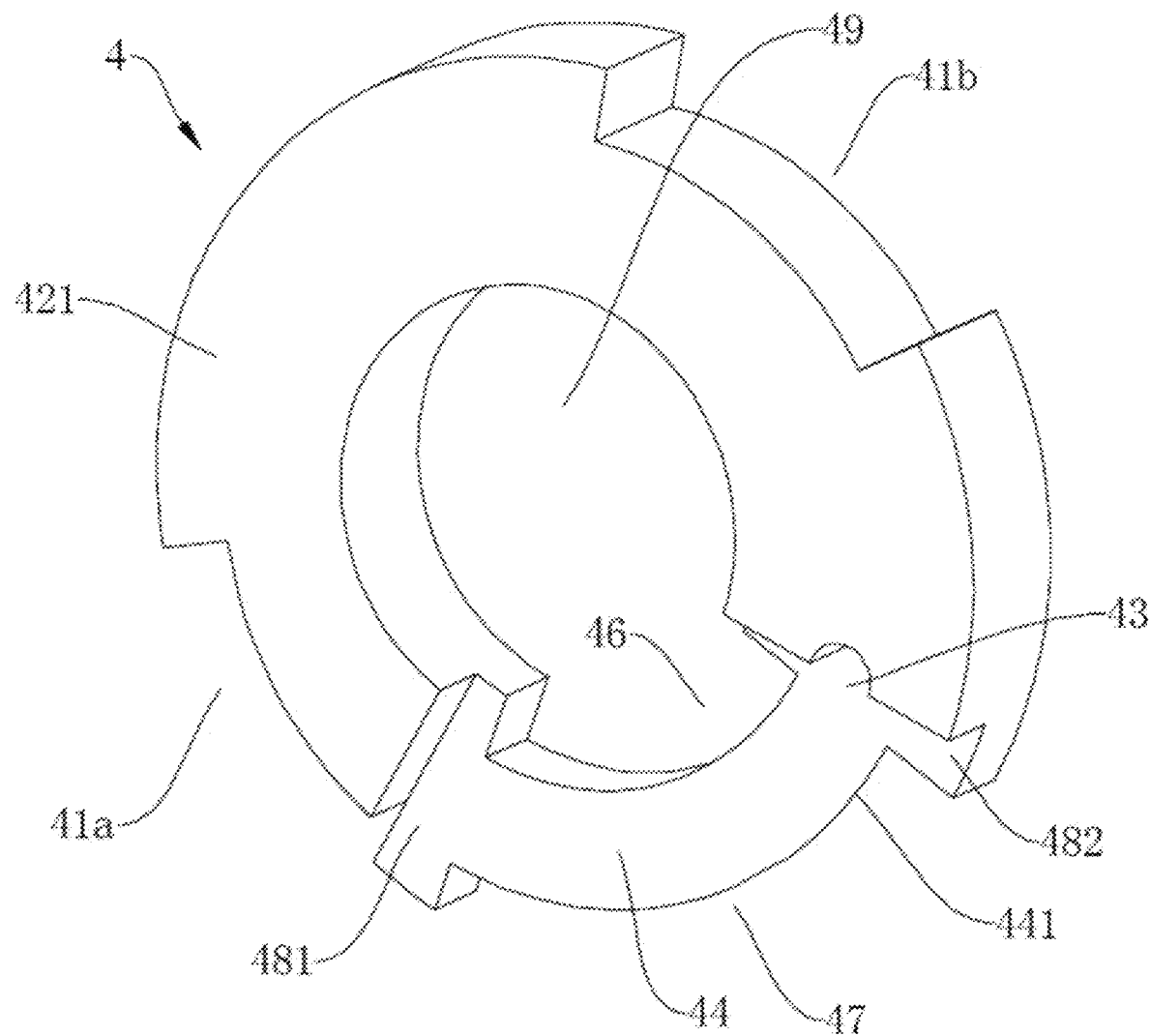
FIG. 12 is a perspective view of an eccentric wheel of a speed reducer according to embodiments of the present technology.
Figure 13:
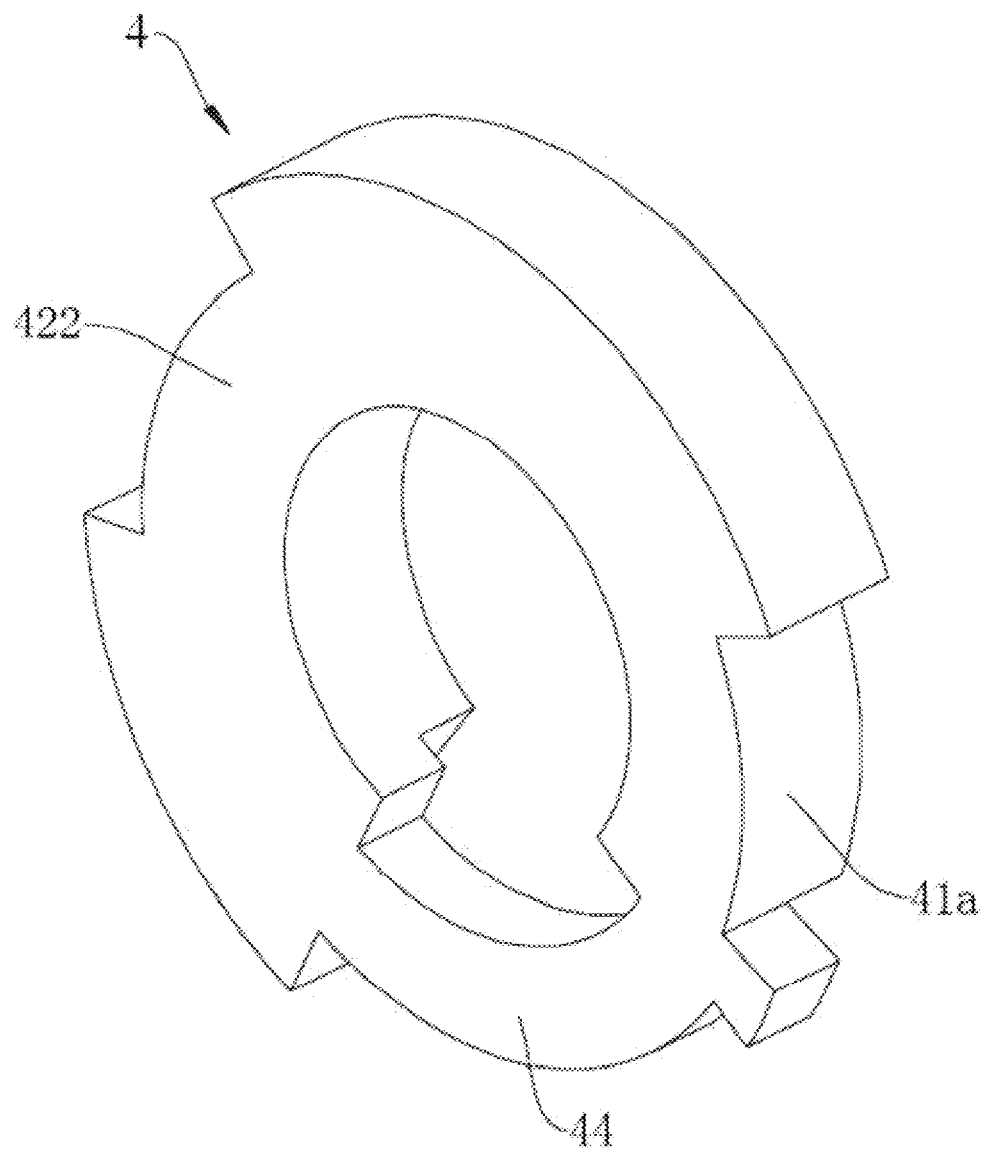
FIG. 13 is another perspective view of an eccentric wheel of a speed reducer according to embodiments of the present technology.

Specifically, as shown in FIGS. 8 to 17, a recess 45 is formed at a junction of the end face of the first end 421 of the eccentric wheel 4 and the outer peripheral surface of the eccentric wheel 4, that is, the recess 45 is at an edge of the end face of the first end 421 of the eccentric wheel 4. The recess 45 is concave from the end face of the first end 421 of the eccentric wheel 4 towards the second end 422 of the eccentric wheel 4 and extends along the circumferential direction of the eccentric wheel 4. In the examples shown in FIGS. 9 to 18, the recess 45 penetrates the eccentric wheel 4 along the axial direction of the eccentric wheel 4. The arc-shaped guide rail 44 is arranged in the recess 45 and extends along the circumferential direction of the eccentric wheel 4. As shown in FIGS. 12 and 13, a surface of the arc-shaped guide rail 44 deviating from the brake block 5 is flush with a surface of the rest part of the eccentric wheel 4 deviating from the brake block 5 (an end face of the second end 422 of the eccentric wheel 4), and a surface of the arc-shaped guide rail 44 facing the brake block 5 is recessed to a surface of the brake block 5 relative to a surface of the rest part of the eccentric wheel 4 (the end face of the first end 421 of the eccentric wheel 4).

At the braking position, part of the brake block 5 may be extended above the first toggle slot 41a to overlap with part of the first toggle slot 41a, thus facilitating the first toggle block 81a fitted in the first toggle slot 41a pushing the brake block 5 corresponding to the first toggle slot 41a. Specifically, the recess 45 is adjacent to the first toggle slot 41a in the circumferential direction of the eccentric wheel 4, and the recess 45 is in connection with the first toggle slot 41a, so that the first toggle block 81a may be in contact with the brake block 5 and push the brake block 5. In some embodiments, the recess 45 may not be in connection with the first toggle slot 41a.

As shown in FIGS. 8 to 17, the recess 45 is in connection with the first toggle slot 41a, to facilitate the first toggle block 81a fitted in the first toggle slot 41a being in contact with and pushing the brake block 5.

In some embodiments, the recess 45 may be in connection with the first toggle slot 41a, and in the braking position, part of the brake block 5 overlaps with part of the first toggle slot 41a.

As shown in FIGS. 8 to 11 and FIGS. 15 to 17, the brake block 5 includes a plate body 53, an outer boss 54, and an inner boss 55. The plate body 53 may be arc-shaped and has an arc-shaped outer peripheral surface and an arc-shaped inner peripheral surface. The plate body 53 has two plate surfaces parallel to each other in its thickness direction, for example, when the brake block 5 is installed on the eccentric wheel 4, the plate body 53 has a first plate surface facing the eccentric wheel 4 and a second plate surface deviating from the eccentric wheel 4, and the outer boss 54 and the inner boss 55 each are arranged on the first plate surface and extend along a circumferential direction of the plate body 53. The outer boss 54 and the inner boss 55 are spaced apart from each other in a radial direction of the plate body 53, the arc-shaped guide groove 52 is formed between the outer boss 54 and the inner boss 55, an outer peripheral surface of the outer boss 54 is flush with the outer peripheral surface of the plate body 53, and an inner peripheral surface of the inner boss 55 is flush with the inner peripheral surface of the plate body 53.

As shown in FIGS. 8 to 17, the plate body 53 of the brake block 5 is fitted in the recess 45, the first plate surface of the plate body 53 abuts against the surface of the arc-shaped guide rail 44 facing the brake block 5, and the second plate surface of the plate body 53 is flush with the end face of the first end 421 of the eccentric wheel 4. In the radial direction of the eccentric wheel 4, the arc-shaped guide rail 44 is located between the outer boss 54 and the inner boss 55, and is slidable relative to the outer boss 54 and the inner boss 55 in the circumferential direction of the eccentric wheel 4. In other words, the arc-shaped guide rail 44 extends into the arc-shaped guide groove 52 and is slidably fitted in the arc-shaped guide groove 52. An end face of the outer boss 54 of the brake block 5 away from the plate body 53 and an end face of the inner boss 55 away from the plate body 53 are flush with the end face of the second end 422 of the eccentric wheel 4.

In the braking position, at least part of the outer peripheral surface of the outer boss 54 and at least part of the outer peripheral surface of the plate body 53 exceed the outer peripheral surface of the eccentric wheel 4 in the radial direction of the eccentric wheel 4 to abut against the outer gear 3, specifically, the brake block 5 abuts against the peripheral wall surface of the outer gear hole 31 of the outer gear 3.

Figure 17:
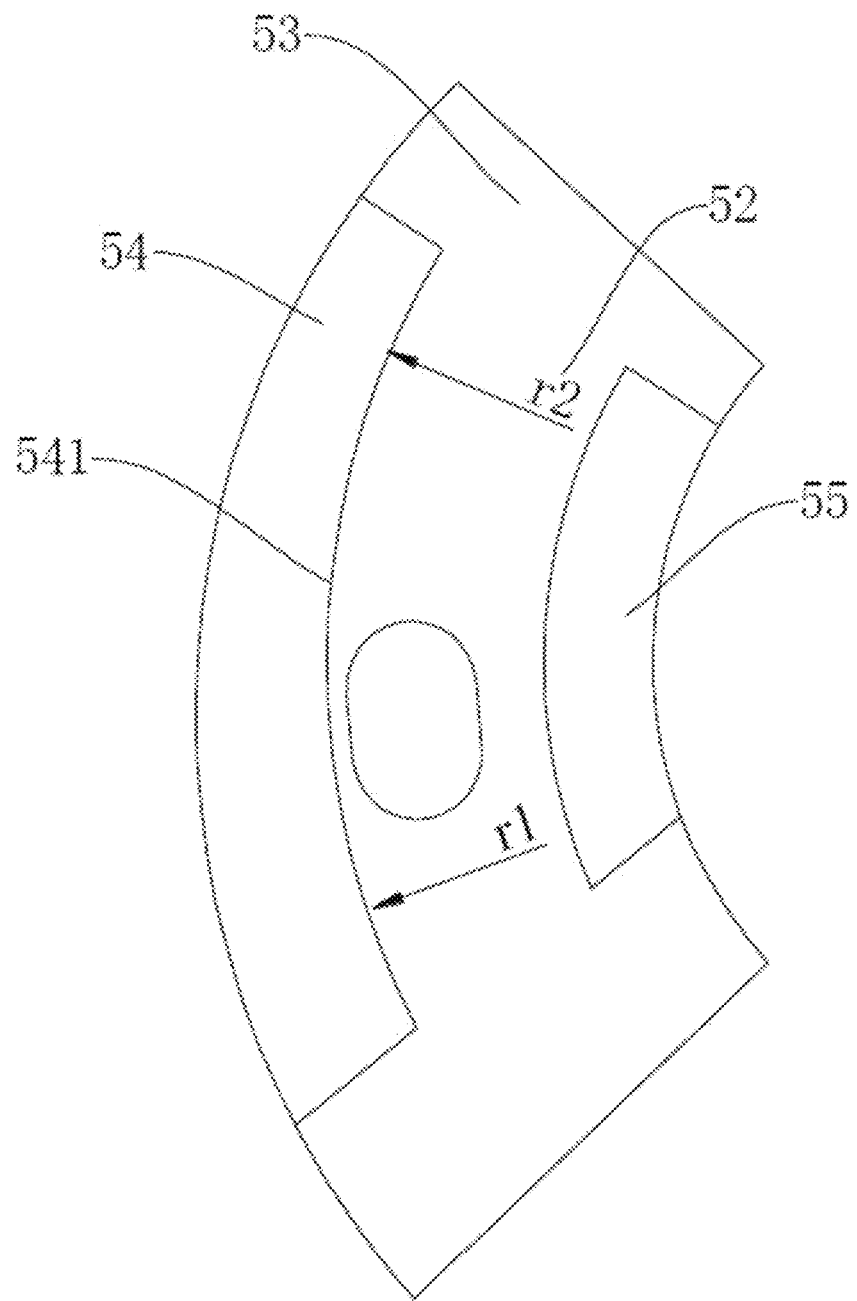
FIG. 17 is a plan view of a brake block of a speed reducer according to embodiments of the present technology.

As shown in FIG. 17, the outer boss 54 has opposite first end and second end in the circumferential direction of the plate body 53, the inner boss 55 has opposite first end and second end in the circumferential direction of the plate body 53, and the plate body 53 has opposite first end and second end in its circumference. The first end of the outer boss 54 and the first end of the inner boss 55 are adjacent to the first end of the plate body 53 and are spaced apart from the first end of the plate body 53 by a first distance, and the second end of the outer boss 54 and the second end of the inner boss 55 are adjacent to the second end of the plate body 53 and are spaced apart from the second end of the plate body 53 by a second distance.

As shown in FIGS. 8 to 14, an inner side of the arc-shaped guide rail 44 has an inner groove 46, and an outer side of the arc-shaped guide rail 44 has an outer groove 47. The inner boss 55 of the brake block 5 is fitted in the inner groove 46 and is slidable along the inner groove 46, and the outer boss 54 of the brake block 5 is fitted in the outer groove 47 and is slidable along the outer groove 47. It should be understood that the inner groove 46 and the outer groove 47 each are arc-shaped grooves, and an outer side and an upper surface of the outer groove 47 are open to form a semi-open groove structure, so that part of the outer boss 54 may extend outwards through the outer groove 47 to abut against the outer gear 3.

Further, the first end of the arc-shaped guide rail 44 has a first step 481, the second end of the arc-shaped guide rail 44 has a second step 482, and the arc-shaped guide rail 44 is located between the first step 481 and the second step 482 in the circumferential direction of the eccentric wheel 4 and is coupled to the first step 481 and the second step 482. An upper surface of the arc-shaped guide rail 44, an upper surface of the first step 481, and an upper surface of the second step 482 are flush; a bottom of the plate body 53 is slidably fitted to the upper surface of the arc-shaped guide rail 44, the upper surface of the first step 481, and the upper surface of the second step 482; and when the eccentric wheel 4 rotates in the counterclockwise direction, the first toggle block 81a in the first toggle slot 41a is in contact with an end face of the plate body 53.

The brake block 5 moves between the release position and the braking position along the arc-shaped guide rail 44 on the eccentric wheel 4, to be separated from or abut against the outer gear 3. In order to more accurately limit the movement path of the brake block 5, make the braking effect of the brake block 5 at the braking position more reliable, and the release effect at the release position more reliable, in some embodiments, a curvature radius of an outer peripheral surface 441 of the arc-shaped guide rail 44 may gradually increase along a direction from the release position to the braking position. In some embodiments, the outer peripheral surface 441 of the arc-shaped guide rail 44 may be a cam surface or a spiral surface gradually expanding radially outwards along the circumferential direction of the eccentric wheel 4.

As an example, as shown in FIG. 14, the curvature radius of the outer peripheral surface 441 of the arc-shaped guide rail 44 gradually increases along the direction from the release position to the braking position, R1 and R2 respectively refer to the curvature radius of the outer peripheral surface 441 of the arc-shaped guide rail 44 at different positions, and a position referred to by R1 in the figure is closer to the release position than a position referred to by R2, in which R1 is less than R2.

Figure 15:
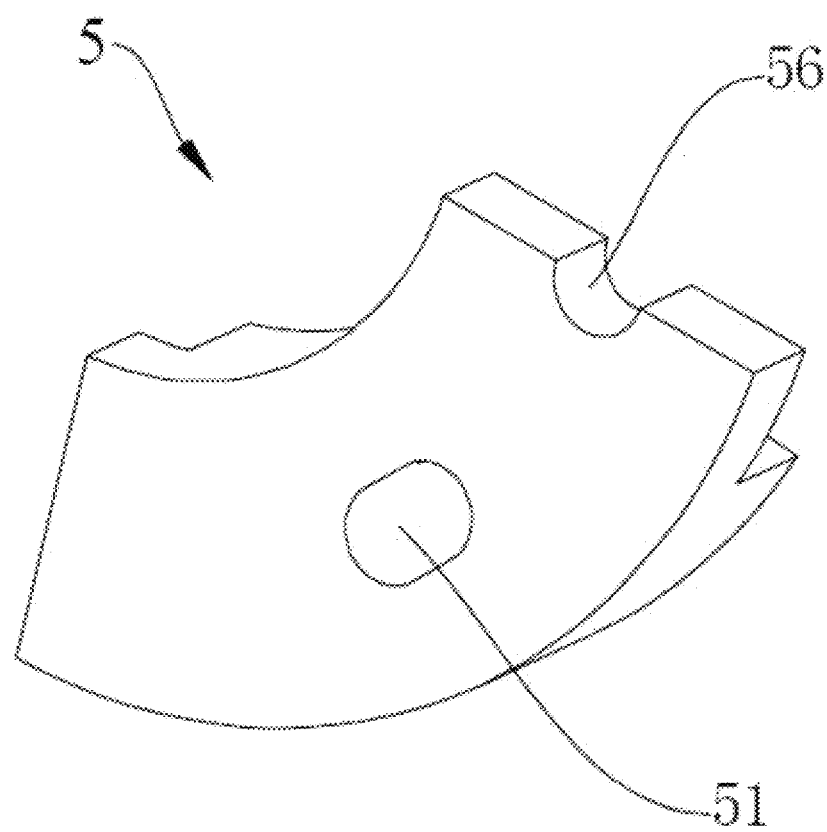
FIG. 15 is a perspective view of a brake block of a speed reducer according to embodiments of the present technology.
Figure 16:
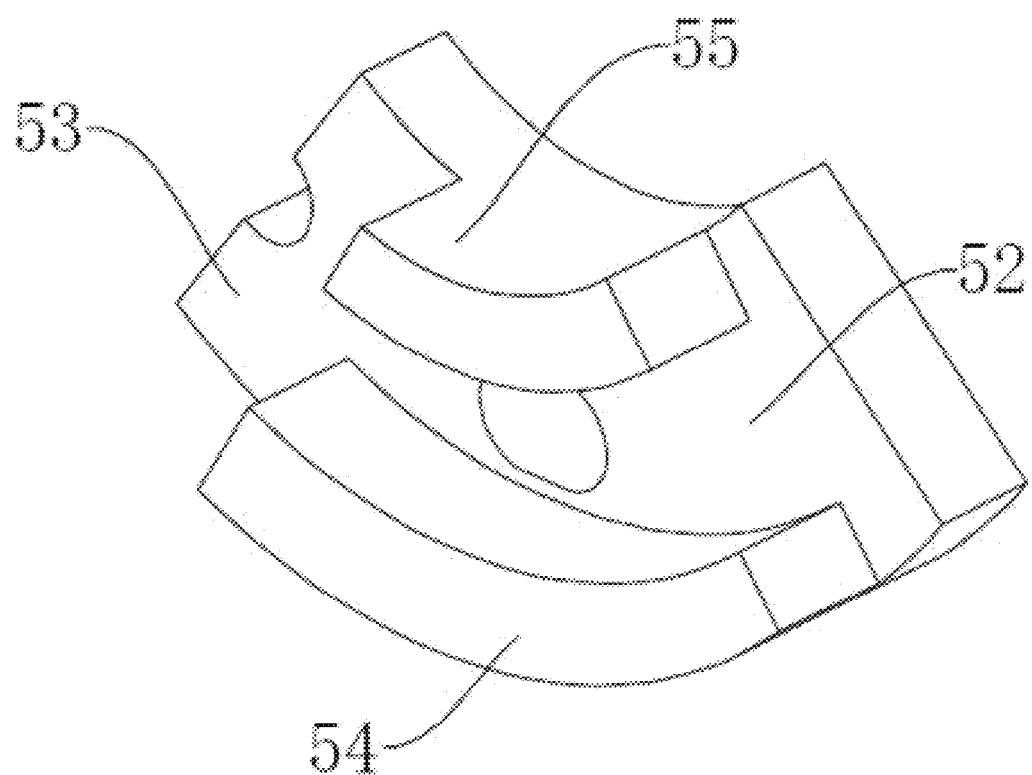
FIG. 16 is another perspective view of a brake block of a speed reducer according to embodiments of the present technology.

As shown in FIGS. 15 to 17, the structure of the outer boss 54 of the brake block 5 is adapted to the structure of the outer groove 47. As shown in FIG. 17, r1 and r2 respectively refer to the curvature radius of an inner peripheral surface 541 of the outer boss 54 at different positions, in which a position referred to by r1 is closer to the release position than a position referred to by r2, and r1 is less than r2.

In some optional embodiments, the speed reducer 100 includes the inner gear 1, the outer gear 3, the eccentric wheel 4, the brake member 5, a spring, and the drive member 8.

As described above, in some examples, the drive member 8 may be configured as the drive disc.

The inner gear 1 has the inner gear hole 11, and the central axis of the inner gear hole 11 is coaxial with the rotation axis of the inner gear 1. The outer gear 3 has the outer gear hole 31, and the outer gear 3 is at least partially arranged in the inner gear hole 11 and meshes with the inner gear 1. The eccentric wheel 4 has the eccentric wheel hole 49, and the eccentric wheel 4 is rotatably arranged in the outer gear hole 31 to drive the outer gear 3 to revolve around the central axis of the eccentric wheel hole 49 and rotate around its axis; the rotation axis of the eccentric wheel 4, the central axis of the eccentric wheel hole 49, and the central axis of the inner gear 1 are coaxial, and the central axis of the outer peripheral surface of the eccentric wheel 4 is eccentric relative to the central axis of the eccentric wheel hole 49. The brake block 5 is arranged on the eccentric wheel 4 to rotate together with the eccentric wheel 4, and the brake block 5 is movable between a braking position and a release position relative to the eccentric wheel 4; in the braking position, the brake block 5 abuts against the outer gear 3, and in the release position, the brake block 5 is separated from the outer gear 3. The spring is coupled to the eccentric wheel 4 and the brake block 5, and is configured to press the brake block 5 towards the braking position.

The drive member 8 is coupled to the eccentric wheel 4, the rotation axis of the drive member 8 is coaxial with the rotation axis of the eccentric wheel 4, the brake block 5 moves to the release position relative to the eccentric wheel 4 when the drive member 8 rotates, so that the drive member 8 drives the eccentric wheel 4 and the brake block 5 to rotate together, and when the drive member 8 stops rotating, the spring pushes the brake block 5 to the braking position to prevent the eccentric wheel 4 and the brake block 5 from rotating together.

The speed reducer according to embodiments of the present technology may realize the automatic reverse braking function by the spring and the brake block with a simple overall structure, a small number of parts, and a small volume, and has the advantages of large braking torque, small consumption of braking friction, low cost, and high braking reliability.

In some optional embodiments, the speed reducer 100 includes the inner gear 1, the outer gear 3, an eccentric member, a brake member, the elastic member 6, and the rotatable drive member 8.

As described above, in some examples, the eccentric member may be configured as the eccentric wheel, the brake member may be configured as the brake block, the elastic member 6 may be configured as the spring, and the drive member 8 may be configured as the drive disc.

The inner gear 1 has the inner gear hole 11, the outer gear 3 has the outer gear hole 31, and the outer gear 3 is at least partially arranged in the inner gear hole 11 and meshes with the inner gear 1. The eccentric member is rotatably arranged in the outer gear hole 31 to drive the outer gear 3, the rotation axis of the eccentric member is coaxial with the central axis of the inner gear 1, the central axis of the outer peripheral surface of the eccentric member is eccentric relative to the rotation axis of the eccentric member, and the outer gear 3 is rotatable around its own axis and revolvable around the rotation axis of the eccentric member.

The brake member is arranged on the eccentric member to rotate together with the eccentric member, and the brake member is movable between the braking position and the release position relative to the eccentric member. In order to realize that the brake member prevents a drive member from rotating in the braking position and allows the drive member to rotate in the release position, at least one of the following methods may be adopted: in a radial direction of the eccentric member, the brake member when in the braking position is further away from the rotation axis of the eccentric member than the brake member when in the release position; when the brake member moves from the release position towards the braking position, the brake member moves along the circumferential direction of the eccentric member and moves outwards along the radial direction of the eccentric member at the same time; and when the brake member moves from the release position towards the braking position, the motion trajectory of the brake member is a spiral or a cam contour gradually expanding radially outwards along the circumferential direction of the eccentric member.

The elastic member 6 is coupled to the eccentric member and the brake member, and is configured to press the brake member towards the braking position. The rotation axis of the drive member is coaxial with the rotation axis of the eccentric member, the brake member moves to the release position relative to the eccentric member when the drive member 8 rotates, so that the drive member 8 drives the eccentric member and the brake member to rotate together, and when the drive member 8 stops rotating, the elastic member 6 pushes the brake member to the braking position to prevent the eccentric member and the brake member from rotating together.

The speed reducer 100 according to embodiments of the present technology may realize the automatic reverse braking function with a simple overall structure, a small number of parts, and a small volume, and has the advantages of large braking torque, small consumption of braking friction, low cost, and high braking reliability.

A joint module according to embodiments of the present technology is described below.

As shown in FIGS. 18 to 23, the joint module 200 according to embodiments of the present technology includes a speed reducer and a motor 210, and the speed reducer is a speed reducer 100 according to any one of the above embodiments. A motor shaft 211 of the motor 210 is coupled to the drive member 8 of the speed reducer 100 to drive the drive member 8 to rotate in a clockwise direction or a counterclockwise direction.

The joint module according to embodiments of the present technology may automatically realize reverse braking: when the motor shaft of the motor rotates, the eccentric wheel and the brake block are driven to rotate together by the drive member, the eccentric wheel drives the outer gear to revolve in the inner gear hole around the central axis of the inner gear hole while driving the outer gear to rotate around its own axis, and the outer gear serves as the output gear to output torque. When the motor shaft of the motor stops rotating, the elastic member pushes the brake block from the release position to the braking position relative to the eccentric wheel, and the brake block abuts against the outer gear, thereby preventing the eccentric wheel and the brake block from rotating relative to the outer gear, that is, the torque (load) applied to the eccentric wheel by the inner gear through the outer gear makes the eccentric wheel rotate, thus the eccentric wheel cannot transmit the torque (load) to the drive member to make the drive member and the motor shaft rotate.

Figure 18:
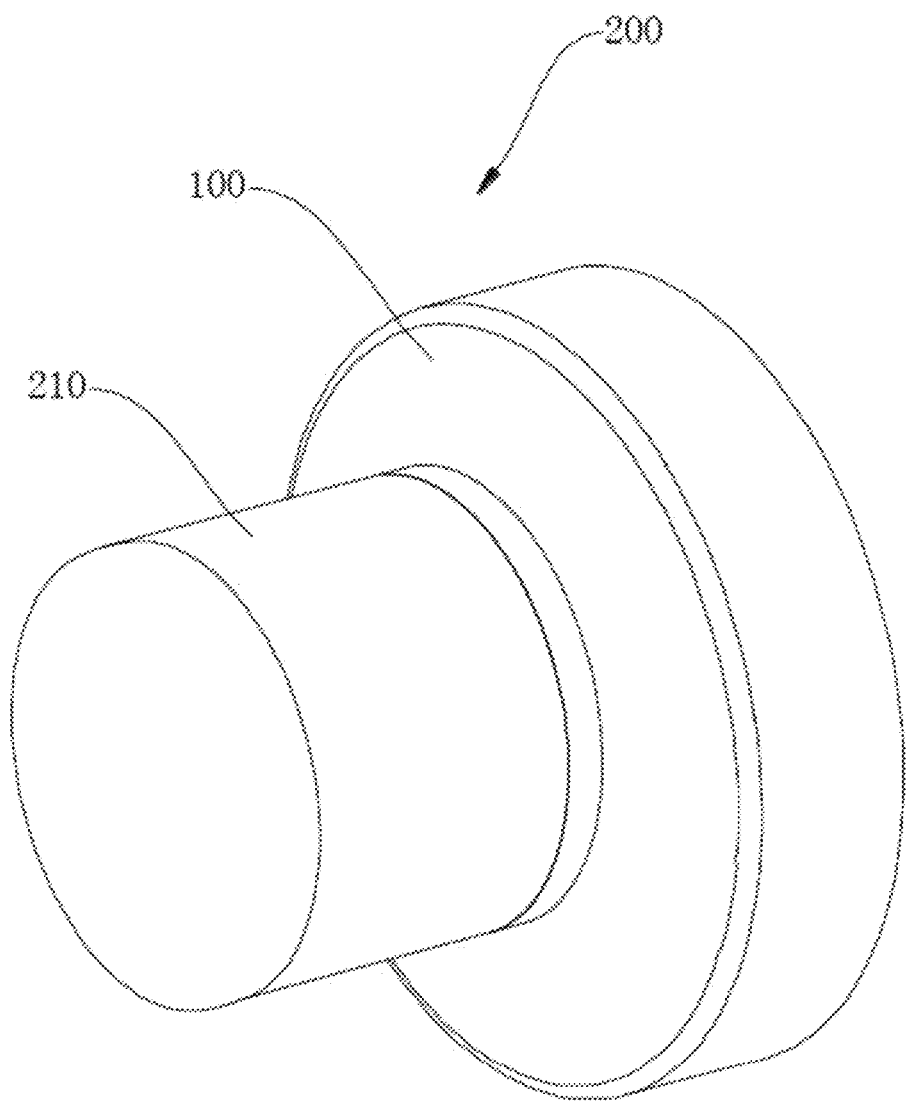
FIG. 18 is a perspective view of a joint module according to embodiments of the present technology.
Figure 19:
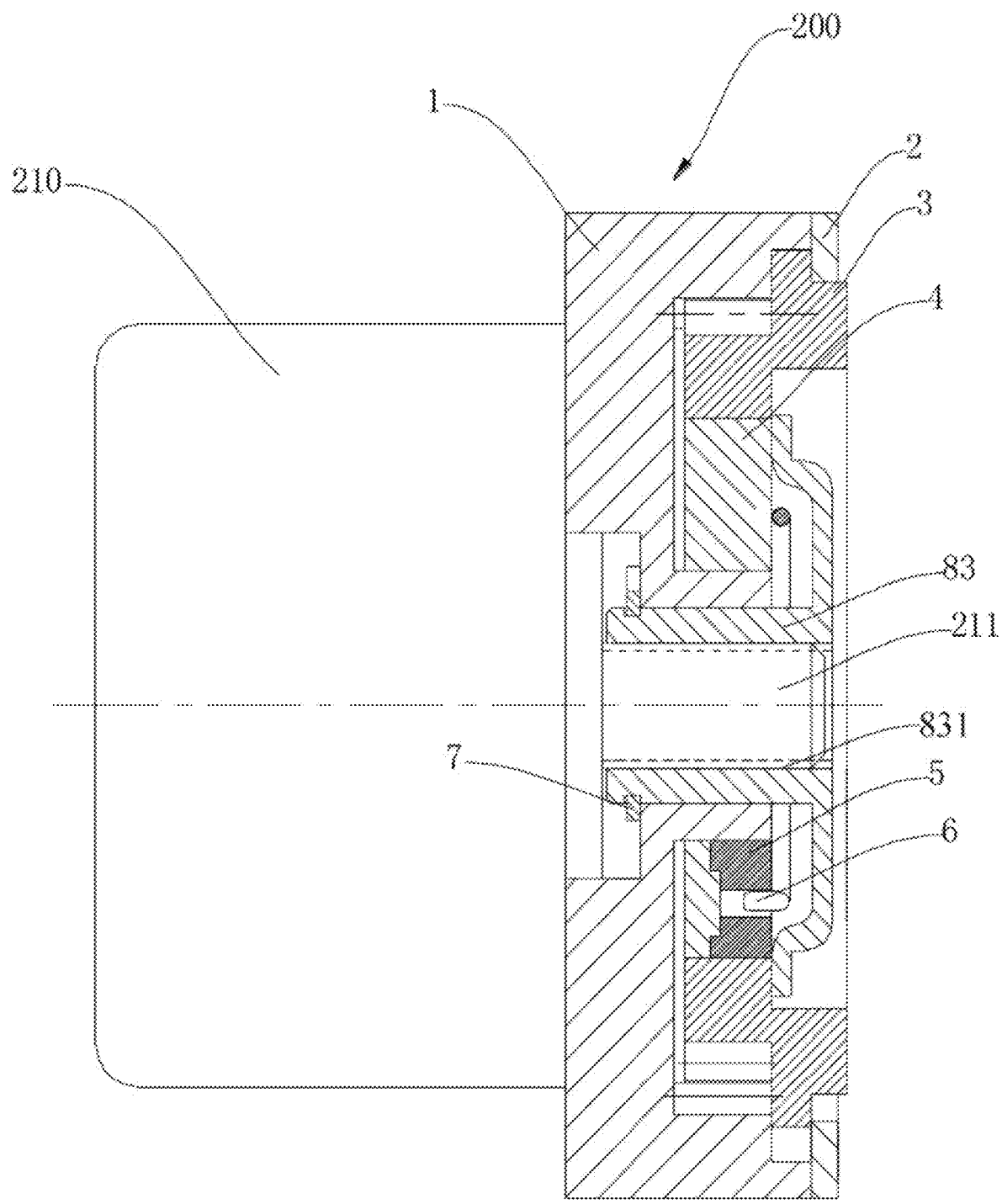
FIG. 19 is a perspective view of a joint module according to embodiments of the present technology.
Figure 20:
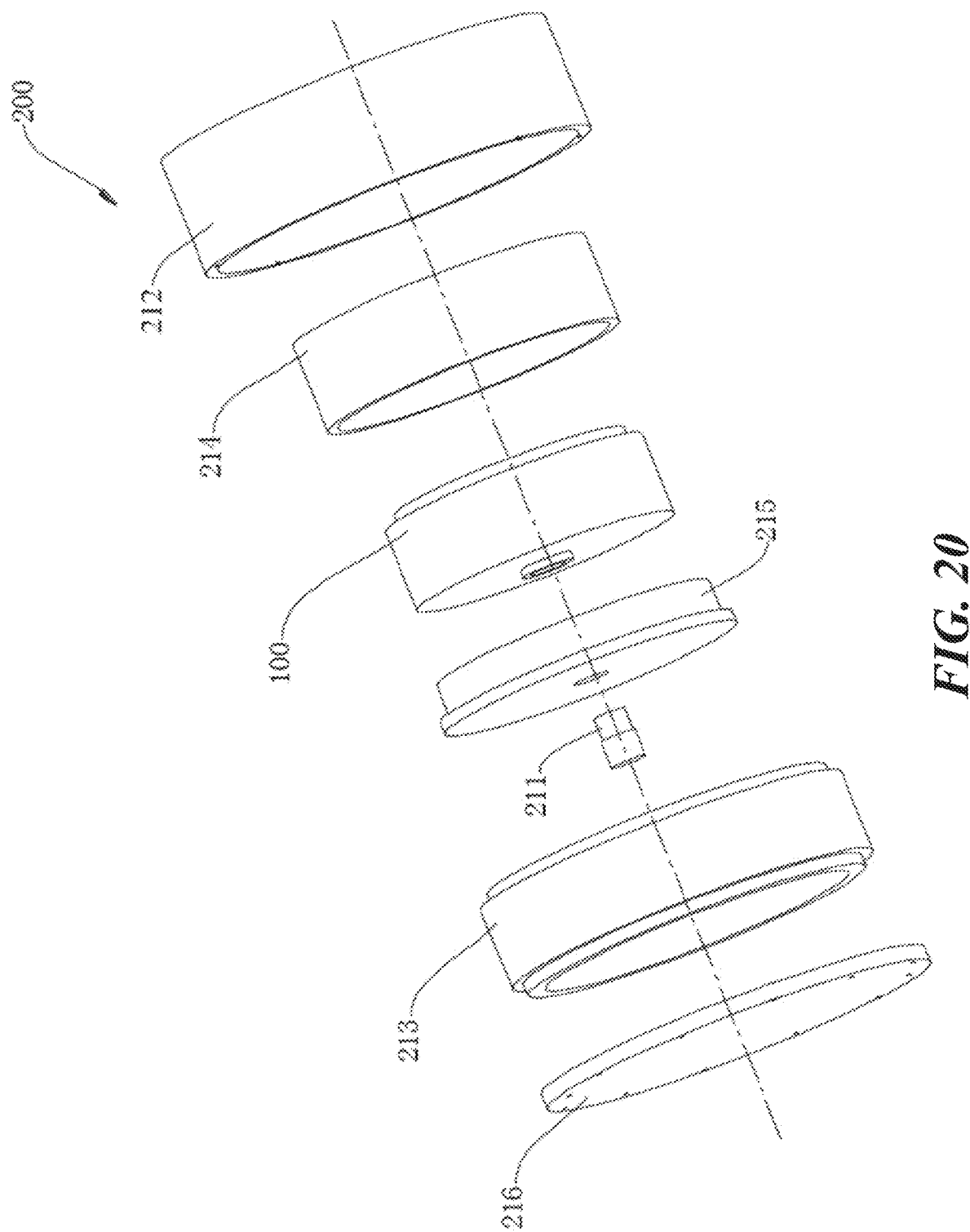
FIG. 20 is a perspective view of a joint module according to another embodiment of the present technology.

In some embodiments, as shown in FIGS. 18 and 19, a casing of the motor 210 abuts against an end face of the inner gear 1 of the speed reducer 100 and is located outside the inner gear 1. The motor shaft 211 extends into the disc hole 831 of the disc hub 83 of the drive member 8 and is coupled to the disc hub 83, to drive the drive member 8 to rotate. In the example shown in FIG. 19, the casing of the motor 210 abuts against a left end face of the inner gear 1, and the motor shaft 211 extends to the right into the disc hole 831 of the disc hub 83 to drive the drive member 8 to rotate.

Figure 21:
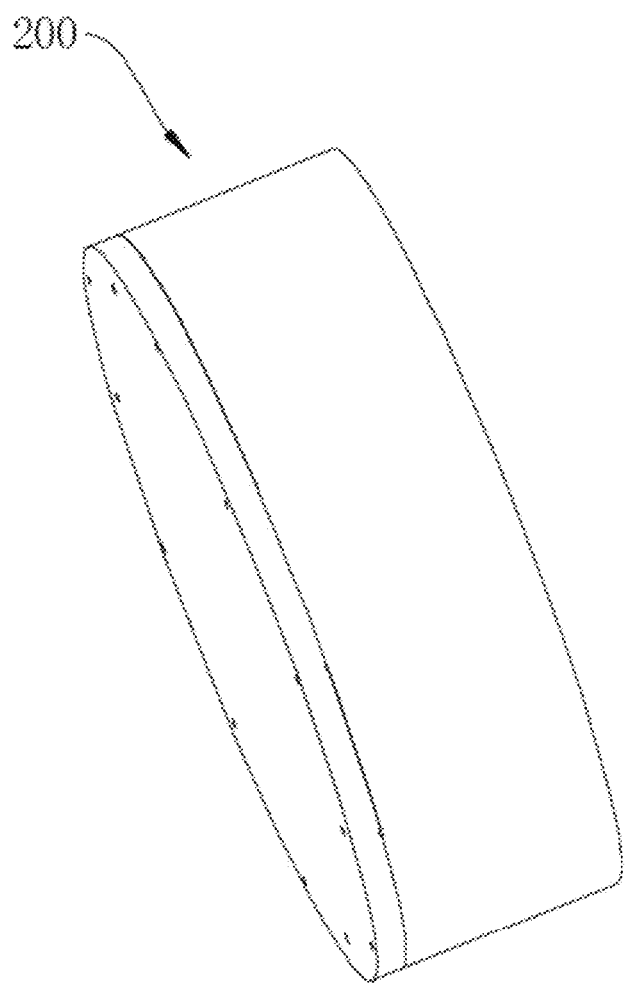
FIG. 21 is a perspective view of a joint module according to another embodiment of the present technology.
Figure 22:
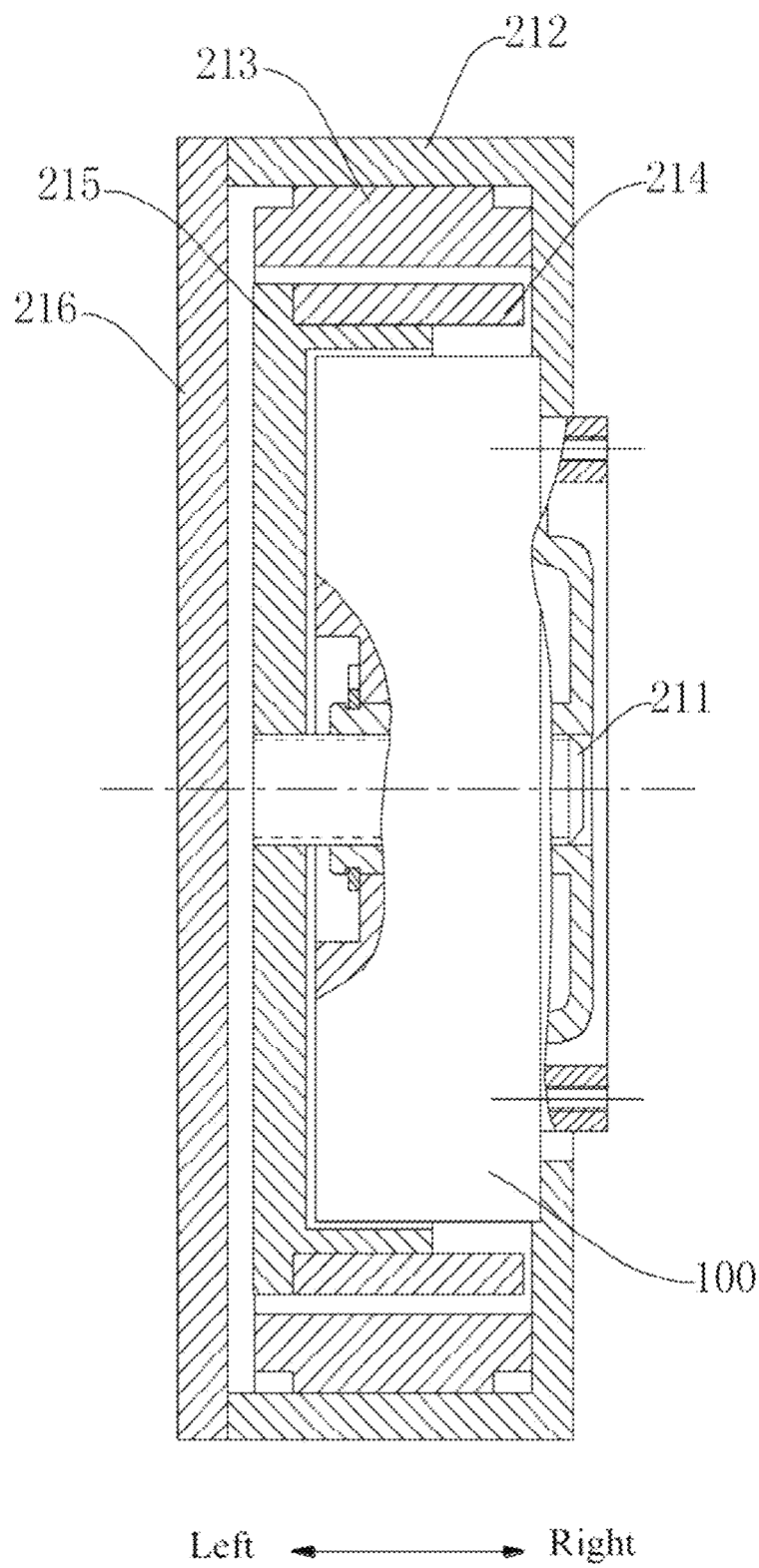
FIG. 22 is a partial sectional view of a joint module according to another embodiment of the present technology.
Figure 23:
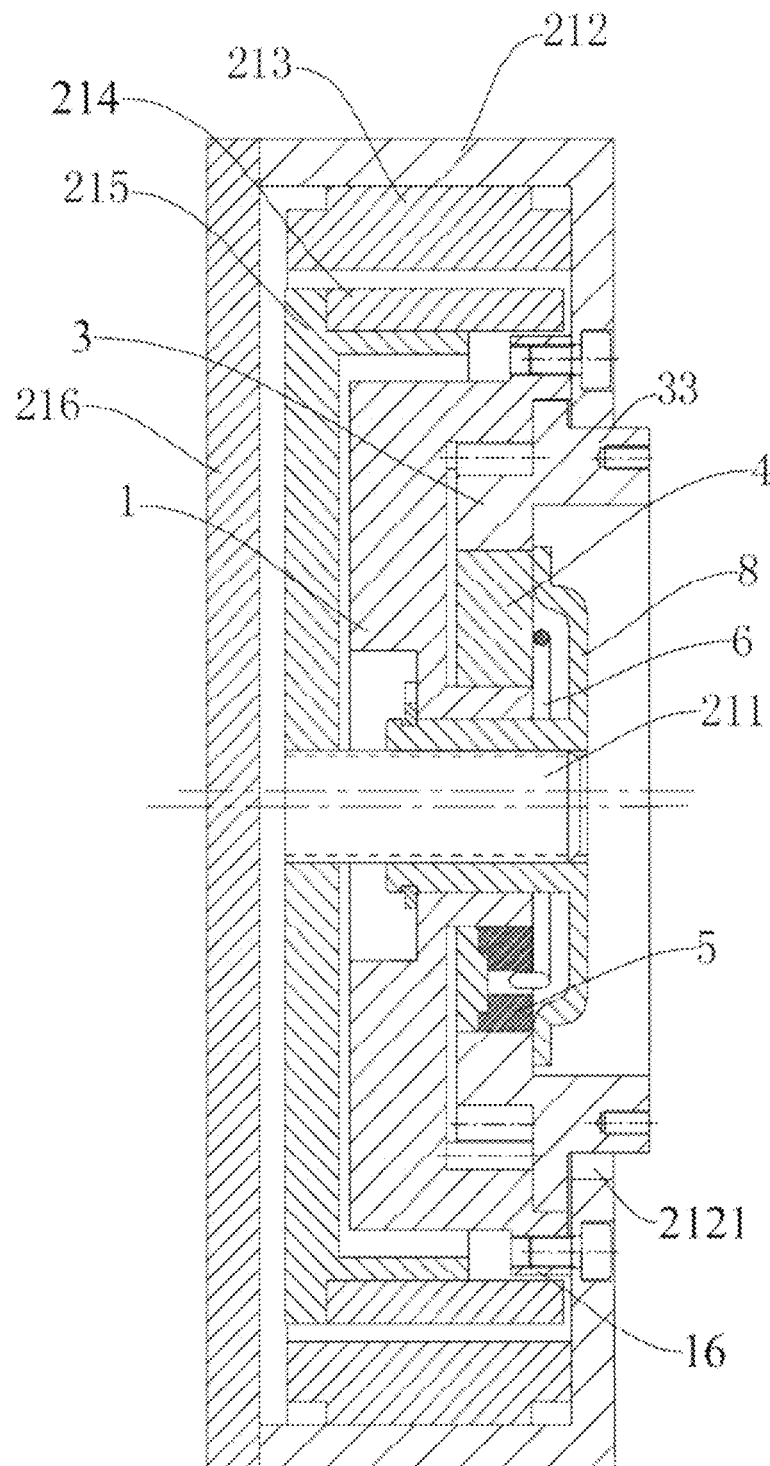
FIG. 23 is a sectional view of a joint module according to another embodiment of the present technology.

In some embodiments, as shown in FIGS. 21 to 23, the speed reducer 100 is at least partially arranged in the motor 210.

In some embodiments, as shown in FIGS. 20 to 23, the motor 210 includes the motor shaft 211, a stator seat 212, a stator 213, a rotor 214, and a rotor seat 215. The stator 213 is arranged in the stator seat 212, the rotor 214 is sleeved on the rotor seat 215, and the rotor 214 and the rotor seat 215 are rotatably arranged in the stator 213. At least part of the speed reducer 100 is located in the rotor 214, the motor shaft 211 of the motor 210 is coupled to the rotor seat 215 and the drive member 8, and the inner gear 1 is coupled to the stator seat 212. A central axis of the stator seat 212, a rotation axis of the stator 213, a rotation axis of the rotor 214, a central axis of the rotor seat 215, a central axis of the motor shaft 211, the rotation axis of the drive member 8, the rotation axis of the eccentric wheel 4, and the central axis of the inner gear 1 are coaxial. The stator 213 drives the rotor 214 to rotate, the rotor 214 drives the motor shaft 211 to rotate, and the motor shaft 211 of the motor 210 drives the drive member 8 to rotate in the clockwise direction or the counterclockwise direction, thereby driving the outer gear 3 to revolve while rotating. The outer gear 3 serves as the output gear and is coupled to other driven components to drive other components.

When the motor shaft 211 of the motor 210 stops rotating, the elastic member 6 pushes the brake block 5 from the release position to the braking position with respect to the eccentric wheel 4, and the brake block 5 abuts against the outer gear 3, to prevent the eccentric wheel 4 and the brake block 5 from rotating relative to the outer gear 3, that is, preventing the torque (load) applied to the outer gear 3 from being reversely transmitted to the drive member 8 through the eccentric wheel 4 to make the drive member 8 and the motor shaft 211 rotate.

In some specific examples, as shown in FIGS. 20 to 23, the stator seat 212 has a first end (a left end in FIG. 23) and a second end (a right end in FIG. 23), the first end of the stator seat 212 is open and covered by a stator cover 216, an end wall of the second end of the stator seat 212 is provided with a through hole 2121, and part of the outer gear 3 is rotatably supported in the through hole 2121.

In this example, as shown in FIG. 23, the speed reducer 100 does not have the cover plate 2. The second end of the inner gear 1 abuts against an end wall of the stator seat 212. The outer peripheral surface of the inner gear 1 near its second end is provided with a connection part 16 opposite to the end wall of the stator seat 212. A connecting bolt passes through the end wall of the stator seat 212 and is coupled to the connection part 16 of the inner gear 1.

The mating section 33 of the outer gear 3 extends out the stator seat 212 through the through hole 2121 of the stator seat 212, is coupled to the driven component, and outputs a rotational torque with revolution. The mating section 33 of the outer gear 3 is rotatably supported in the through hole 2121, and the end wall of the stator seat 212 abuts against the limiting flange 331 of the outer gear 3. The limiting flange 331, which stops the outer gear 3, is configured to limit the outer gear 3.

In other examples, the mating section 33 of the outer gear 3 may be flush with an outer surface of the end wall of the second end of the stator seat 212 (a left end face in FIG. 23).

Alternatively, the outer gear 3 is integrally located inside the end wall of the second end of the stator seat 212.

A robotic arm according to embodiments of the present technology is described below.

Figure 24:
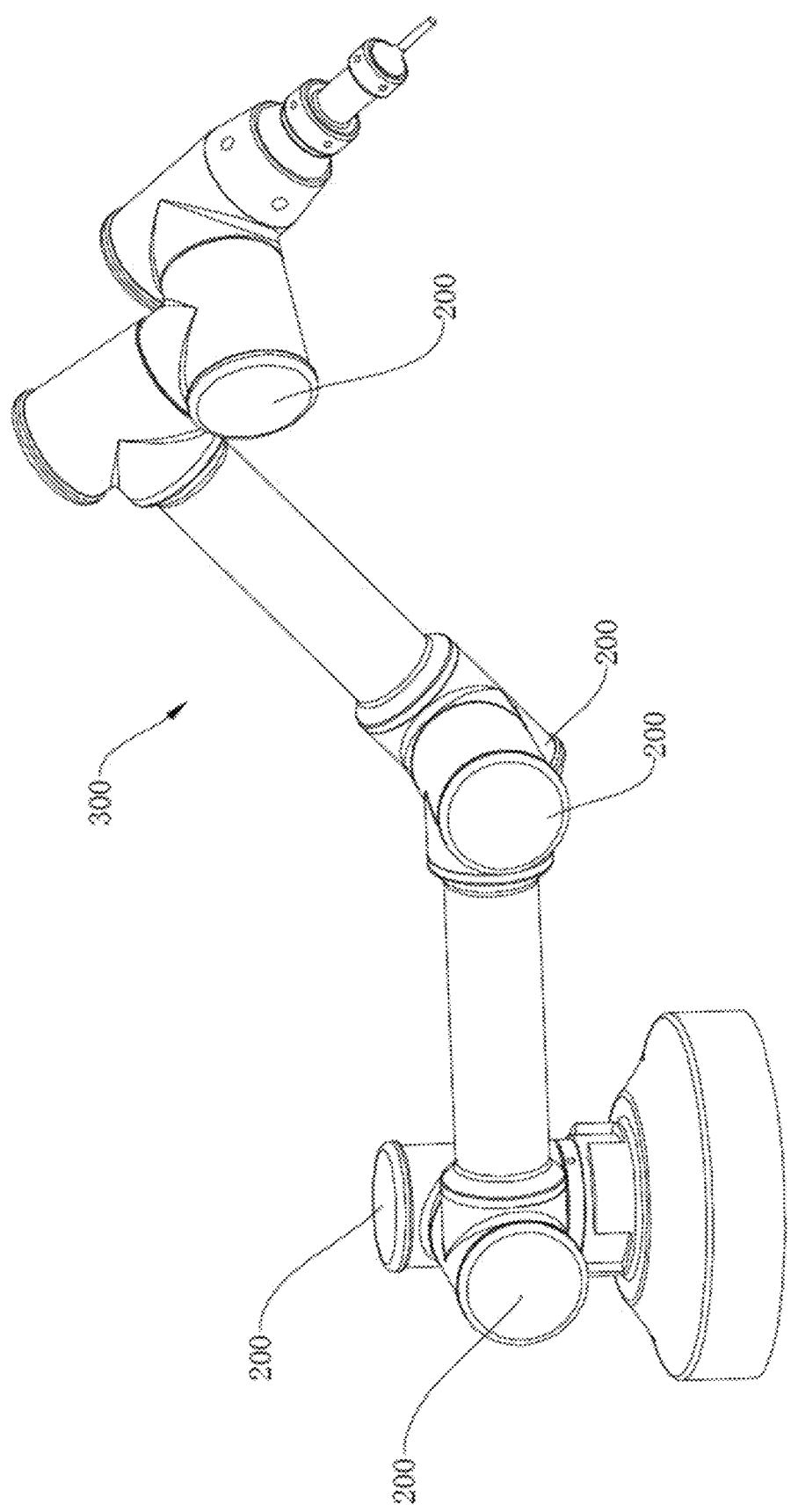
FIG. 24 is a schematic view of a robotic arm according to embodiments of the present technology.

FIG. 24 shows a robotic arm 300 according to embodiments of the present technology. The robotic arm 300 includes a plurality of joint modules 200, and the robotic arm 300 may perform various actions and operations under drive of the joint modules 200.

Figure 25:
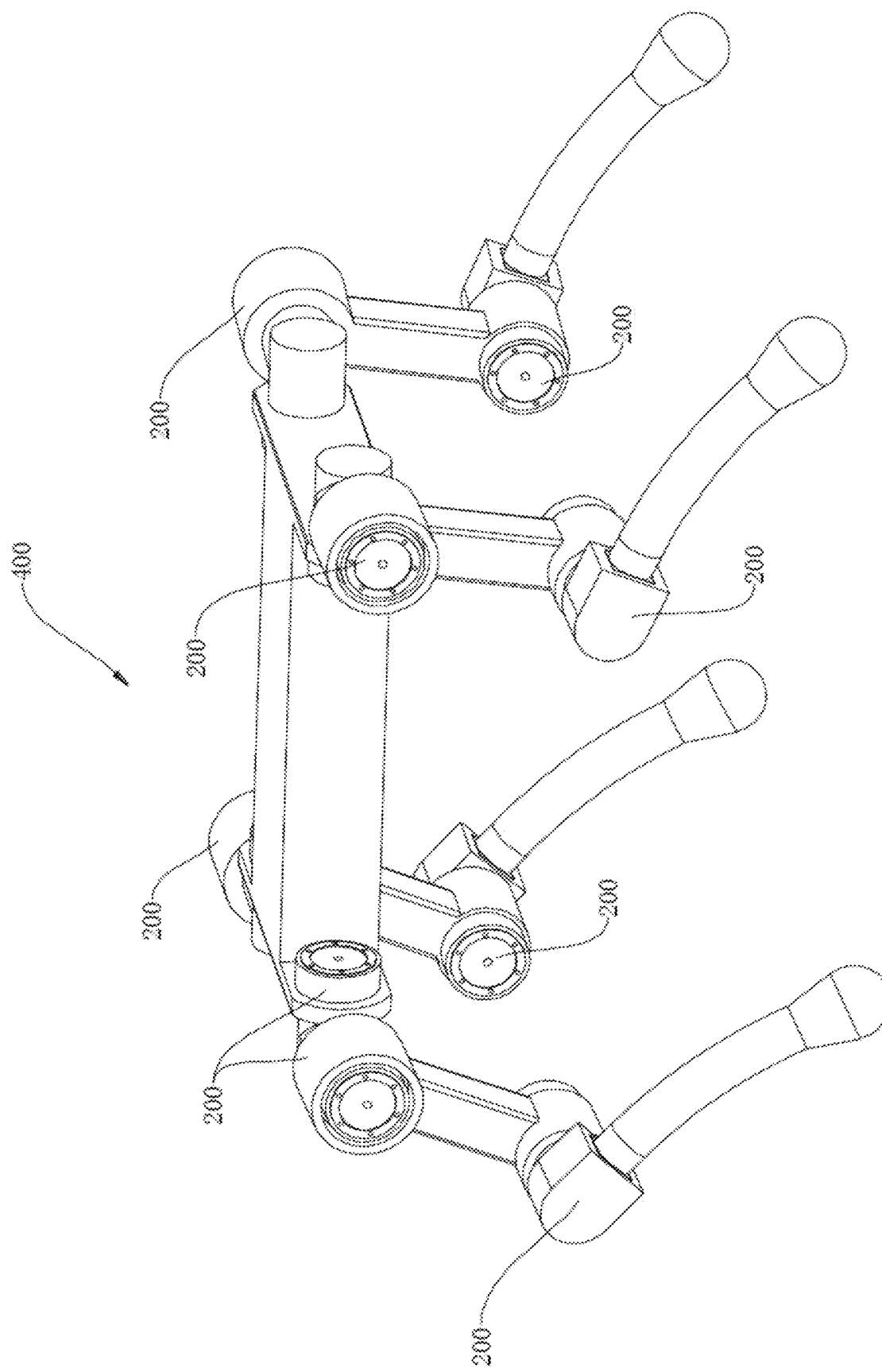
FIG. 25 is a schematic view of a robot according to embodiments of the present technology.

FIG. 25 shows a robot 400 according to embodiments of the present technology. The robot 400 includes a plurality of joint modules 200, and the robot 400 may achieve various actions under drive of the joint modules 200.

It should be understood that the robotic arm 300 and/or the robot 400 according to embodiments of the present technology are not limited to forms shown in the figures.

A production system according to embodiments of the present technology may include the robotic arm 300 and/or the robot 400 according to embodiments of the present technology. For example, the production system may be an automotive production line or another product production line.

For example, the production system according to embodiments of the present technology may be an automobile production line or other product production line, and the robotic arm 300 and/or the robot 400 may be configured to pick up components of the automobile and/or assemble the automobile and its components.

An electric device according to embodiments of the present technology may include the joint module 200 according to embodiments of the present technology.

Figure 26:
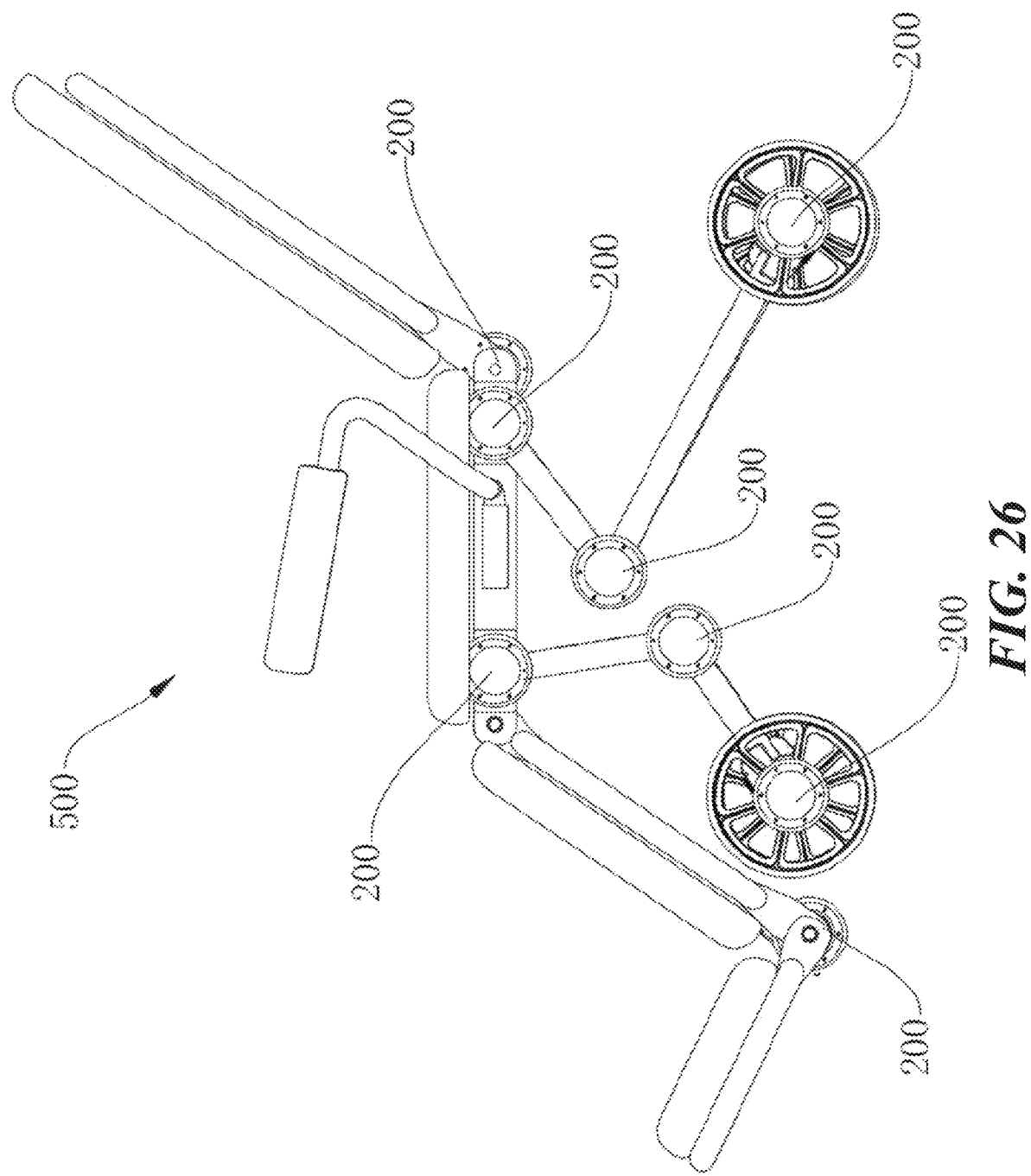
FIG. 26 is a schematic view of an electric device according to embodiments of the present technology.

In some embodiments, the electric device may be an electric wheelchair or an electric bed. For example, as shown in FIG. 26, the electric device according to embodiments of the present technology is an electric wheelchair 500, and the electric wheelchair may walk and change its form under drive of the joint module 200.

It should be understood that the electric device according to embodiments of the present technology is not limited to the electric bed and the electric wheelchair.

EXAMPLES

In some embodiments in accordance with the present technology (example 1) a speed reducer includes an inner gear having an inner gear hole; an outer gear having an outer gear hole, and at least partially arranged in the inner gear hole and interfaced with the inner gear; an eccentric wheel rotatably supported in the outer gear hole, wherein the eccentric wheel has a rotation axis that is coaxial with a central axis of the inner gear, and wherein the outer gear is configured to be driven by the eccentric wheel to revolve around the rotation axis of the eccentric wheel while rotating around its own axis; a brake block arranged on the eccentric wheel to rotate together with the eccentric wheel, the brake block being movable relative to the eccentric wheel between a braking position where the brake block abuts against the outer gear and a release position where the brake block is separated from the outer gear; an elastic member coupled to the eccentric wheel and the brake block, wherein the elastic member is configured to press the brake block towards the braking position; and a drive member coupled to the eccentric wheel, wherein the drive member has a rotation axis that is coaxial with the rotation axis of the eccentric wheel, wherein, when the drive member rotates, the brake block moves to the release position relative to the eccentric wheel so that the drive member drives the eccentric wheel and the brake block to rotate together, and when the drive member stops rotating, the elastic member pushes the brake block to the braking position to prevent the eccentric wheel and the brake block from rotating together.

Example 2 includes the speed reducer of example 1 or any of examples 1-16, wherein the eccentric wheel is provided with a toggle slot, the drive member is provided with a toggle block, and the toggle block is movably fitted in the toggle slot; and wherein, when the drive member rotates in one of a clockwise direction and a counterclockwise direction, the toggle block overcomes an elastic force of the elastic member and pushes the brake block to the release position to drive the eccentric wheel and the brake block to rotate together.

Example 3 includes the speed reducer of example 2 or any of examples 1-16, wherein when the drive member rotates in the other one of the clockwise direction and the counterclockwise direction, the toggle block drives the eccentric wheel to rotate to make the brake block overcome the elastic force of the elastic member and move to the release position, so that the toggle block drives the eccentric wheel and the brake block to rotate together.

Example 4 includes the speed reducer of example 2 or any of examples 1-16, wherein the toggle slot is in an outer peripheral surface of the eccentric wheel, and the toggle slot extends for a predetermined length along a circumferential direction of the outer peripheral surface of the eccentric wheel and penetrates along an axial direction of the eccentric wheel.

Example 5 includes the speed reducer of example 2 or any of examples 1-16, wherein the drive member is a drive disc and comprises a disc body and a disc hub located at a center of the disc body, and the toggle block is arranged on the disc body.

Example 6 includes the speed reducer of example 5 or any of examples 1-16, wherein the inner gear has a central flange extending in the inner gear hole, the central flange has a flange hole, and the disc hub is rotatably fitted in the flange hole.

Example 7 includes the speed reducer of example 6 or any of examples 1-16, wherein the eccentric wheel has an eccentric wheel hole, the eccentric wheel hole is coaxial with the inner gear, and the central flange is rotatably fitted in the eccentric wheel hole.

Example 8 includes the speed reducer of example 1 or any of examples 1-16, further comprising a cover plate, wherein the inner gear has a first end and a second end, and the cover plate is arranged at the second end of the inner gear to limit the outer gear.

Example 9 includes the speed reducer of example 8 or any of examples 1-16, wherein the inner gear hole comprises an inner gear hole segment and a limiting hole segment, inner teeth of the inner gear are formed on a peripheral wall of the inner gear hole segment, and a diameter of the limiting hole segment is greater than a diameter of the inner gear hole segment; and the outer gear comprises an outer gear section and a mating section, outer teeth of the outer gear are formed on an outer peripheral surface of the outer gear section, an outer peripheral surface of the mating section is provided with a limiting flange rotatably fitted in the limiting hole segment, the mating section is rotatably fitted in a cover plate hole of the cover plate, and the cover plate stops the limiting flange.

Example 10 includes the speed reducer of example 9 or any of examples 1-16, wherein the outer gear hole comprises an outer gear hole segment and a mating hole segment, a diameter of the mating hole segment is greater than a diameter of the outer gear hole segment, the eccentric wheel is rotatably fitted in the outer gear hole segment, the inner gear has a central flange located in the inner gear hole, and the central flange has a flange hole; and the drive member comprises a disc body and a disc hub located at a center of the disc body, the disc body is located in the mating hole segment, and the disc hub is rotatably fitted in the flange hole.

Example 11 includes the speed reducer of example 1 or any of examples 1-16, wherein the eccentric wheel is provided with a first insertion hole and the brake block is provided with a second insertion hole; and the elastic member is an arc-shaped spring, and the elastic member has a first end fitted in the first insertion hole and a second end fitted in the second insertion hole.

Example 12 includes the speed reducer of example 1 or any of examples 1-16, wherein the eccentric wheel is provided with one of a guide rail and a guide groove; the brake block is provided with the other one of the guide rail and the guide groove; and the guide rail is slidably fitted in the guide groove.

Example 13 includes the speed reducer of example 12 or any of examples 1-16, wherein the guide rail is arranged on the eccentric wheel; the guide rail and the guide groove are arc-shaped; and a curvature radius of an outer peripheral surface of the guide rail gradually increases along a direction from the release position to the braking position, or the outer peripheral surface of the guide rail forms a cam surface or a spiral surface gradually expanding radially outwards along a circumferential direction of the eccentric wheel.

Example 14 includes the speed reducer of example 13 or any of examples 1-16, wherein a recess is formed at a junction of at least one end face of the eccentric wheel and an outer peripheral surface of the eccentric wheel, and the arc-shaped guide rail is arranged in the recess; a surface of the guide rail facing away from the brake block is flush with a surface of a rest part of the eccentric wheel facing away from the brake block; and a surface of the guide rail facing the brake block is recessed relative to a surface of the rest part of the eccentric wheel facing the brake block.

Example 15 includes the speed reducer of example 14 or any of examples 1-16, wherein the brake block comprises an arc-shaped plate body, an arc-shaped outer boss, and an arc-shaped inner boss; the outer boss and the inner boss are arranged on the plate body and extend along a circumferential direction of the plate body; the outer boss and the inner boss are spaced apart from each other in a radial direction of the plate body; the arc-shaped guide groove is formed between the outer boss and the inner boss; an outer peripheral surface of the outer boss is flush with an outer peripheral surface of the plate body, and an inner peripheral surface of the inner boss is flush with an inner peripheral surface of the plate body; and in the braking position, at least part of the outer peripheral surface of the outer boss and at least part of the outer peripheral surface of the plate body exceed the outer peripheral surface of the eccentric wheel in a radial direction of the eccentric wheel to abut against the outer gear; a first end of the outer boss and a first end of the inner boss are spaced apart from a first end of the plate body by a first distance, and a second end of the outer boss and a second end of the inner boss are spaced apart from a second end of the plate body by a second distance.

Example 16 includes the speed reducer of example 1 or any of examples 1-15, wherein the eccentric wheel is provided with a first toggle slot and a second toggle slot; the drive member is provided with a first toggle block and a second toggle block; the first toggle block is movably fitted in the first toggle slot, and the second toggle block is movably fitted in the second toggle slot; and the brake block corresponds to the first toggle slot; when the drive member rotates counterclockwise, the first toggle block overcomes an elastic force of the elastic member and pushes the brake block to the release position; and when the brake block moves to the release position, the second toggle block is spaced apart from or is in contact with an end wall surface of the second toggle slot.

In some embodiments in accordance with the present technology (example 17) a joint module includes the speed reducer according to any of examples 1-16; and a motor, a motor shaft of the motor being coupled to a drive member of the speed reducer to drive the drive member to rotate.

In some embodiments in accordance with the present technology (example 18) a robotic arm includes the joint module according to example 17.

In some embodiments in accordance with the present technology (example 19) a speed reducer includes an inner gear having an inner gear hole, a central axis of the inner gear hole being coaxial with a rotation axis of the inner gear; an outer gear having an outer gear hole, the outer gear being at least partially arranged in the inner gear hole and interfaced with the inner gear; an eccentric wheel having an eccentric wheel hole, the eccentric wheel being rotatably arranged in the outer gear hole to drive the outer gear to revolve around a central axis of the eccentric wheel hole and rotate around its own axis, wherein a rotation axis of the eccentric wheel, the central axis of the eccentric wheel hole, and the central axis of the inner gear hole are coaxial, and a central axis of an outer peripheral surface of the eccentric wheel is eccentric relative to the central axis of the eccentric wheel hole; a brake block arranged on the eccentric wheel to rotate together with the eccentric wheel, wherein the brake block is movable relative to the eccentric wheel between a braking position where the brake block abuts against the outer gear and a release position where the brake block is separated from the outer gear; a spring coupled to the eccentric wheel and the brake block, and configured to press the brake block towards the braking position; and a drive member coupled to the eccentric wheel, a rotation axis of the drive member being coaxial with the rotation axis of the eccentric wheel, wherein, when the drive member rotates, the brake block moves to the release position relative to the eccentric wheel so that the drive member drives the eccentric wheel and the brake block to rotate together, and when the drive member stops rotating, the spring pushes the brake block to the braking position to prevent the eccentric wheel and the brake block from rotating together.

In some embodiments in accordance with the present technology (example 20) a speed reducer includes an inner gear having an inner gear hole; an outer gear having an outer gear hole, the outer gear being at least partially arranged in the inner gear hole and interfaced with the inner gear; an eccentric member rotatably arranged in the outer gear hole to drive the outer gear, a rotation axis of the eccentric member being coaxial with a central axis of the inner gear, a central axis of an outer peripheral surface of the eccentric member being eccentric relative to the rotation axis of the eccentric member, and the outer gear being rotatable around its own axis and revolvable around the rotation axis of the eccentric member; a brake member arranged on the eccentric member to rotate together with the eccentric member, the brake member being movable between a braking position and a release position relative to the eccentric member, wherein in a radial direction of the eccentric member, the brake member when in the braking position is further away from the rotation axis of the eccentric member than when in the release position; or when the brake member moves from the release position towards the braking position, the brake member moves along a circumferential direction of the eccentric member and moves outwards along the radial direction of the eccentric member at the same time; or when the brake member moves from the release position towards the braking position, a motion trajectory of the brake member is a spiral or a cam contour gradually expanding radially outwards along the circumferential direction of the eccentric member; an elastic member coupled to the eccentric member and the brake member, and configured to press the brake member towards the braking position; and a rotatable drive member, a rotation axis of the drive member being coaxial with the rotation axis of the eccentric member, wherein, when the drive member rotates, the brake member moves to the release position relative to the eccentric member so that the drive member drives the eccentric member and the brake member to rotate together, and when the drive member stops rotating, the elastic member pushes the brake member to the braking position to prevent the eccentric member and the brake member from rotating together.

CONCLUSION

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. For example, the drive member 8 may be interfaced with, configured as, or include a motor, and the motor can include a control unit embodying various systems, digital electronic circuitry, or in computer software, firmware, or hardware, which structurally and/or functionally interfaced with the motor of the drive member 8.

Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., FPGA (field programmable gate array) or ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

In the specification, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation as then described or as shown in the drawings under discussion. These relative terms are for convenience of description and do not indicate or imply that the device or element referred to must have a particular orientation or be constructed and operated in a particular orientation. There terms shall not be construed as limitation on the present technology.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, the term "a plurality of" means at least two, e.g., two or three, unless specified otherwise.

In the present disclosure, unless specified or limited otherwise, the terms "mounted," "connected," "coupled," "fixed," and the like are used broadly, and may be, for example, fixed connections, detachable connections, or integral connections; may also be mechanical or electrical connections; may also be a mutual connection; may also be direct connections or indirect connections via intervening structures; and may also be an inner connection or a mutual interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or may just mean that the first feature is at a height higher than that of the second feature; while a first feature "below," "under," or "on the bottom of" a second feature may include an embodiment in which the first feature is right or obliquely "below," "under," or "on the bottom of" the second feature, or may just mean that the first feature is at a height lower than that of the second feature.

Reference throughout this specification to "an embodiment," "some embodiments," "an example," "a specific example," or "some examples" means that a particular feature, structure, material, or characteristic described in connection with the embodiment or example is included in at least one embodiment or example of the present technology. Thus, the appearances of the phrases in various places throughout this specification are not necessarily referring to the same embodiment or example of the present technology. Furthermore, the particular features, structures, materials, or characteristics may be combined in any suitable manner in one or more embodiments or examples. Moreover, different embodiments or examples as well as features in different embodiments or examples described in this specification may be combined and united by those skilled in the art in case of no mutual contradiction.

Although some embodiments have been shown and described, it would be appreciated by those skilled in the art that the above embodiments are exemplary and cannot be construed to limit the present technology, and changes, modifications, alternatives, and variations can be made in the embodiments without departing from the scope of the present technology.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A speed reducer, comprising:
   an inner gear having an inner gear hole;
   an outer gear having an outer gear hole, and at least partially arranged in the inner gear hole and interfaced with the inner gear;
   an eccentric wheel rotatably supported in the outer gear hole, wherein the eccentric wheel has a rotation axis that is coaxial with a central axis of the inner gear, and wherein the outer gear is configured to be driven by the eccentric wheel to revolve around the rotation axis of the eccentric wheel while rotating around its own axis;
   a brake block arranged on the eccentric wheel to rotate together with the eccentric wheel, the brake block being movable relative to the eccentric wheel between a braking position where the brake block abuts against the outer gear and a release position where the brake block is separated from the outer gear;
   an elastic member coupled to the eccentric wheel and the brake block, wherein the elastic member is configured to press the brake block towards the braking position; and
   a drive member coupled to the eccentric wheel, wherein the drive member has a rotation axis that is coaxial with the rotation axis of the eccentric wheel, wherein, when the drive member rotates, the brake block moves to the release position relative to the eccentric wheel so that the drive member drives the eccentric wheel and the brake block to rotate together, and when the drive member stops rotating, the elastic member pushes the brake block to the braking position to prevent the eccentric wheel and the brake block from rotating together.

2. The speed reducer according to claim 1, wherein the eccentric wheel is provided with a toggle slot, the drive member is provided with a toggle block, and the toggle block is movably fitted in the toggle slot; and
   when the drive member rotates in one of a clockwise direction and a counterclockwise direction, the toggle block overcomes an elastic force of the elastic member and pushes the brake block to the release position to drive the eccentric wheel and the brake block to rotate together.

3. The speed reducer according to claim 2, wherein when the drive member rotates in the other one of the clockwise direction and the counterclockwise direction, the toggle block drives the eccentric wheel to rotate to make the brake block overcome the elastic force of the elastic member and move to the release position, so that the toggle block drives the eccentric wheel and the brake block to rotate together.

4. The speed reducer according to claim 2, wherein the toggle slot is in an outer peripheral surface of the eccentric wheel, and the toggle slot extends for a predetermined length along a circumferential direction of the outer peripheral surface of the eccentric wheel and penetrates along an axial direction of the eccentric wheel.

5. The speed reducer according to claim 2, wherein the drive member is a drive disc and comprises a disc body and a disc hub located at a center of the disc body, and the toggle block is arranged on the disc body.

6. The speed reducer according to claim 5, wherein the inner gear has a central flange extending in the inner gear hole, the central flange has a flange hole, and the disc hub is rotatably fitted in the flange hole.

7. The speed reducer according to claim 6, wherein the eccentric wheel has an eccentric wheel hole, the eccentric wheel hole is coaxial with the inner gear, and the central flange is rotatably fitted in the eccentric wheel hole.

8. The speed reducer according to claim 1, further comprising a cover plate, wherein the inner gear has a first end and a second end, and the cover plate is arranged at the second end of the inner gear to limit the outer gear.

9. The speed reducer according to claim 8, wherein:
the inner gear hole comprises an inner gear hole segment and a limiting hole segment, inner teeth of the inner gear are formed on a peripheral wall of the inner gear hole segment, and a diameter of the limiting hole segment is greater than a diameter of the inner gear hole segment; and
the outer gear comprises an outer gear section and a mating section, outer teeth of the outer gear are formed on an outer peripheral surface of the outer gear section, an outer peripheral surface of the mating section is provided with a limiting flange rotatably fitted in the limiting hole segment, the mating section is rotatably fitted in a cover plate hole of the cover plate, and the cover plate stops the limiting flange.

10. The speed reducer according to claim 9, wherein the outer gear hole comprises an outer gear hole segment and a mating hole segment, a diameter of the mating hole segment is greater than a diameter of the outer gear hole segment, the eccentric wheel is rotatably fitted in the outer gear hole segment, the inner gear has a central flange located in the inner gear hole, and the central flange has a flange hole; and
the drive member comprises a disc body and a disc hub located at a center of the disc body, the disc body is located in the mating hole segment, and the disc hub is rotatably fitted in the flange hole.

11. The speed reducer according to claim 1, wherein the eccentric wheel is provided with a first insertion hole and the brake block is provided with a second insertion hole; and
the elastic member is an arc-shaped spring, and the elastic member has a first end fitted in the first insertion hole and a second end fitted in the second insertion hole.

12. The speed reducer according to claim 1, wherein the eccentric wheel is provided with one of a guide rail and a guide groove; the brake block is provided with the other one of the guide rail and the guide groove; and the guide rail is slidably fitted in the guide groove.

13. The speed reducer according to claim 12, wherein the guide rail is arranged on the eccentric wheel; the guide rail and the guide groove are arc-shaped; and a curvature radius of an outer peripheral surface of the guide rail gradually increases along a direction from the release position to the braking position.

14. The speed reducer according to claim 13, wherein a recess is formed at a junction of at least one end face of the eccentric wheel and an outer peripheral surface of the eccentric wheel, and the arc-shaped guide rail is arranged in the recess; a surface of the guide rail facing away from the brake block is flush with a surface of a rest part of the eccentric wheel facing away from the brake block; and a surface of the guide rail facing the brake block is recessed relative to a surface of the rest part of the eccentric wheel facing the brake block.

15. The speed reducer according to claim 14, wherein the brake block comprises an arc-shaped plate body, an arc-shaped outer boss, and an arc-shaped inner boss; the outer boss and the inner boss are arranged on the plate body and extend along a circumferential direction of the plate body; the outer boss and the inner boss are spaced apart from each other in a radial direction of the plate body; the arc-shaped guide groove is formed between the outer boss and the inner boss; an outer peripheral surface of the outer boss is flush with an outer peripheral surface of the plate body, and an inner peripheral surface of the inner boss is flush with an inner peripheral surface of the plate body; and
in the braking position, at least part of the outer peripheral surface of the outer boss and at least part of the outer peripheral surface of the plate body exceed the outer peripheral surface of the eccentric wheel in a radial direction of the eccentric wheel to abut against the outer gear; a first end of the outer boss and a first end of the inner boss are spaced apart from a first end of the plate body by a first distance, and a second end of the outer boss and a second end of the inner boss are spaced apart from a second end of the plate body by a second distance.

16. The speed reducer according to claim 1, wherein the eccentric wheel is provided with a first toggle slot and a second toggle slot; the drive member is provided with a first toggle block and a second toggle block; the first toggle block is movably fitted in the first toggle slot, and the second toggle block is movably fitted in the second toggle slot; and
the brake block corresponds to the first toggle slot; when the drive member rotates counterclockwise, the first toggle block overcomes an elastic force of the elastic member and pushes the brake block to the release position; and when the brake block moves to the release position, the second toggle block is spaced apart from or is in contact with an end wall surface of the second toggle slot.

17. A joint module, comprising:
the speed reducer according to claim 1; and
a motor, a motor shaft of the motor being coupled to a drive member of the speed reducer to drive the drive member to rotate.

18. A robotic arm, comprising the joint module according to claim 17.

19. A speed reducer, comprising:
an inner gear having an inner gear hole, a central axis of the inner gear hole being coaxial with a rotation axis of the inner gear;
an outer gear having an outer gear hole, the outer gear being at least partially arranged in the inner gear hole and interfaced with the inner gear;
an eccentric wheel having an eccentric wheel hole, the eccentric wheel being rotatably arranged in the outer gear hole to drive the outer gear to revolve around a central axis of the eccentric wheel hole and rotate around its own axis, wherein a rotation axis of the eccentric wheel, the central axis of the eccentric wheel hole, and the central axis of the inner gear hole are coaxial, and a central axis of an outer peripheral surface of the eccentric wheel is eccentric relative to the central axis of the eccentric wheel hole;
a brake block arranged on the eccentric wheel to rotate together with the eccentric wheel, wherein the brake block is movable relative to the eccentric wheel between a braking position where the brake block abuts against the outer gear and a release position where the brake block is separated from the outer gear;
a spring coupled to the eccentric wheel and the brake block, and configured to press the brake block towards the braking position; and a drive member coupled to the eccentric wheel, a rotation axis of the drive member being coaxial with the rotation axis of the eccentric wheel, wherein, when the drive member rotates, the brake block moves to the release position relative to the eccentric wheel so that the drive member drives the eccentric wheel and the brake block to rotate together, and when the drive member stops rotating, the spring pushes the brake block to the braking position to prevent the eccentric wheel and the brake block from rotating together.

20. A speed reducer, comprising:

an inner gear having an inner gear hole;

an outer gear having an outer gear hole, the outer gear being at least partially arranged in the inner gear hole and interfaced with the inner gear;

an eccentric member rotatably arranged in the outer gear hole to drive the outer gear, a rotation axis of the eccentric member being coaxial with a central axis of the inner gear, a central axis of an outer peripheral surface of the eccentric member being eccentric relative to the rotation axis of the eccentric member, and the outer gear being rotatable around its own axis and revolvable around the rotation axis of the eccentric member;

a brake member arranged on the eccentric member to rotate together with the eccentric member, the brake member being movable between a braking position and a release position relative to the eccentric member, wherein in a radial direction of the eccentric member, the brake member when in the braking position is further away from the rotation axis of the eccentric member than when in the release position; or when the brake member moves from the release position towards the braking position, the brake member moves along a circumferential direction of the eccentric member and moves outwards along the radial direction of the eccentric member at the same time;

an elastic member coupled to the eccentric member and the brake member, and configured to press the brake member towards the braking position; and a rotatable drive member, a rotation axis of the drive member being coaxial with the rotation axis of the eccentric member, wherein, when the drive member rotates, the brake member moves to the release position relative to the eccentric member so that the drive member drives the eccentric member and the brake member to rotate together, and when the drive member stops rotating, the elastic member pushes the brake member to the braking position to prevent the eccentric member and the brake member from rotating together.

* * * * *